(12) United States Patent
Muraki et al.

(10) Patent No.: US 10,581,032 B2
(45) Date of Patent: Mar. 3, 2020

(54) LITHIUM BATTERY PACKAGING MATERIAL

(71) Applicant: TOPPAN PRINTING CO., LTD., Tokyo (JP)

(72) Inventors: Takuya Muraki, Tokyo (JP); Tomohiko Yamazaki, Tokyo (JP); Masayoshi Suzuta, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 82 days.

(21) Appl. No.: 15/254,558

(22) Filed: Sep. 1, 2016

(65) Prior Publication Data

US 2016/0372720 A1 Dec. 22, 2016

Related U.S. Application Data

(63) Continuation of application No. PCT/JP2015/055688, filed on Feb. 26, 2015.

(30) Foreign Application Priority Data

Mar. 6, 2014 (JP) .................................. 2014-044167
Mar. 6, 2014 (JP) .................................. 2014-044168

(51) Int. Cl.
*H01M 2/02* (2006.01)
*B32B 7/12* (2006.01)
(Continued)

(52) U.S. Cl.
CPC ............. *H01M 2/0287* (2013.01); *B32B 7/12* (2013.01); *B32B 15/08* (2013.01); *B32B 15/088* (2013.01);
(Continued)

(58) Field of Classification Search
None
See application file for complete search history.

(56) References Cited

U.S. PATENT DOCUMENTS 5,965,686 A 10/1999 Blank et al.
2010/0015451 A1 1/2010 Suzuta

FOREIGN PATENT DOCUMENTS

JP 2000-302745 A 10/2000
JP 2006-281612 A 10/2006
(Continued)

OTHER PUBLICATIONS

Extended European Search Report dated Sep. 25, 2017 in Application No. 15758697.5.

(Continued)

*Primary Examiner* — Wyatt P McConnell
(74) *Attorney, Agent, or Firm* — Foley & Lardner LLP

(57) ABSTRACT

A lithium battery packaging material of the present invention includes a laminate in which a substrate layer, a first adhesive layer, a metal foil layer, a corrosion prevention treatment layer, a second adhesive layer, and a sealant layer are laminated in this order. In the packaging material, the corrosion prevention treatment layer contains an rare-earth oxide, and 1 to 100 parts by mass of phosphoric acid or phosphate relative to 100 parts by mass of the rare-earth oxide, the second adhesive layer includes an adhesive composition containing an acid modified polyolefin resin and a polyfunctional isocyanate compound, and, in an infrared absorption spectrum of the second adhesive layer, a ratio (Y/X) between absorption (X) derived from C—H bending vibration of $CH_3$ and absorption (Y) derived from N—H bending vibration of a biuret bond is 0.3 or less.

5 Claims, 6 Drawing Sheets

(51) Int. Cl.
*B32B 15/08* (2006.01)
*B32B 27/32* (2006.01)
*B32B 15/088* (2006.01)
*B32B 15/20* (2006.01)
*B32B 27/34* (2006.01)
*H01M 10/052* (2010.01)
*H01M 10/0525* (2010.01)

(52) U.S. Cl.
CPC ............. *B32B 15/20* (2013.01); *B32B 27/32* (2013.01); *B32B 27/34* (2013.01); *B32B 2255/06* (2013.01); *B32B 2255/26* (2013.01); *B32B 2307/518* (2013.01); *B32B 2307/714* (2013.01); *B32B 2439/40* (2013.01); *B32B 2457/10* (2013.01); *H01M 10/052* (2013.01); *H01M 10/0525* (2013.01); *H01M 2220/30* (2013.01)

(56) References Cited

FOREIGN PATENT DOCUMENTS

| | | |
|---|---|---|
| JP | 2007-095652 A | 4/2007 |
| JP | 2009-26485 A | 2/2009 |
| JP | 2010-092703 A | 4/2010 |
| JP | 2012-216364 A | 11/2012 |
| JP | 2013-134823 A | 7/2013 |
| JP | 2013-218990 A | 10/2013 |
| JP | 2015-170461 A | 9/2015 |
| TW | 201342690 A | 10/2013 |
| WO | WO-2008/093778 A1 | 8/2008 |
| WO | WO-2012/114776 A1 | 8/2012 |
| WO | WO-2013115232 A1 * | 8/2013 |

OTHER PUBLICATIONS

International Search Report issued in International Patent Application No. PCT/JP2015/055688 dated Jun. 2, 2015.
Japanese Office Action dated Apr. 27, 2017 in corresponding application No. JP-2014-044168.
Chinese Office Action dated Jan. 31, 2019 in corresponding application No. 201580012214.3.
Adhesive Technology Textbook for Professionals; Editor: Japan Adhesive Society; Publisher: Haruhiro Imizu; Publishing House: Nikkan Kogyo Shimbun, Ltd.; First Edition, Jun. 30, 2009; Third Edition, Sep. 25, 2014.
Asahi Kasei Corporation URL [Printed May 21, 2019] (http://www.akcpc.jp/duranate/ichiran.html; Document indicating known technology).
Infrared Absorption Diagram Overview—Fundamentals and Practice of Organic Structural Chemistry; Author: Hiroshi Horiguchi, Professor Emeritus, PhD of Engineering, University of Kobe; Publishing House: Sankyo Shuppan Co., Ltd.; First Edition: Feb. 15, 1973, Reprint First Edition: May 10, 1977; Reprint 8th Edition: Jun. 30, 2001.
Patent Opposition issued on Japanese Patent No. 6,428,906 dated May 27, 2019 (4 pages).

* cited by examiner

LITHIUM BATTERY PACKAGING MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/055688 filed on Feb. 26, 2015, which is based upon and claims the benefit of priority of Japanese Patent Application No. 2014-044167, filed on Mar. 6, 2014, and Japanese Patent Application No. 2014-044168, filed on Mar. 6, 2014, the entire contents of which are all hereby incorporated by reference.

TECHNICAL FIELD

The present invention relates to a lithium battery packaging material.

BACKGROUND

As consumer secondary batteries used for mobile terminal devices, such as personal computers and mobile phones, video cameras, and the like, lithium ion batteries have been actively developed, which have high energy but can be downsized and formed in an ultra-thin shape.

As a packaging material for lithium ion batteries (hereinafter, also simply referred to as "packaging material"), laminated films with a multilayer structure have come to be used increasingly instead of a conventional metal can due to the advantages such as of having light weight and enabling choice of a desired battery shape. Packaging materials using such laminated film not only enables choice of a desired battery shape but also realizes light weight, high heat radiation protection and production at low cost. Therefore, such packaging materials are offered for applications to batteries for environment-friendly hybrid vehicles and electric vehicles which are increasingly developed in recent years.

Such a laminated film is typically configured by laminating a sealant layer (heat fusible film) to one surface of a metal foil layer, such as an aluminum foil, via an adhesive layer and laminating a substrate layer (plastic film) to the other surface via an adhesive layer (substrate layer/adhesive layer/metal foil layer/adhesive layer/sealant layer).

A lithium ion battery using a laminated film type packaging material is formed, for example, as follows. Firstly, the laminated film mentioned above is deep drawn using cold forming (deep drawing) to obtain a part. Then, an electrolytic solution or an electrolytic solution layer made of a polymer gel impregnated with an electrolytic solution is accommodated in the part together with a cathode material, an anode material, and a separator as a battery body. The part is formed into a product by heat sealing, with such members being accommodated therein.

As the electrolytic solution, an electrolytic solution obtained by dissolving a lithium salt in an aprotic solvent (propylene carbonate, ethylene carbonate, dimethyl carbonate, diethyl carbonate, ethyl methyl carbonate, etc.) can be used.

The electrolytic solution easily permeates into a sealant layer. Therefore, in a lithium ion battery, the electrolytic solution that has permeated in the sealant layer reduces lamination strength between the metal foil layer and the sealant layer and can finally leak out. Lithium salts, such as $LiPF_6$ and $LiBF_4$, as electrolytes can generate hydrofluoric acid by hydrolysis reaction. Hydrofluoric acid causes corrosion in a metal surface and deteriorates lamination strength between layers of the laminated film. Therefore, packaging materials are required to have a corrosion prevention performance against electrolytic solutions and hydrofluoric acid.

As adhesives to adhere a sealant layer with a metal foil layer, polyurethane adhesives have been typically used. Such a polyurethane adhesive is obtained by formulating a polyfunctional isocyanate compound with a diol component.

However, the polyurethane adhesive is likely to be swollen with an organic solvent. In addition, a urethane bond forming the polyurethane adhesive is poor in durability to an electrolytic solution and hydrofluoric acid.

PTL 1, for example, discloses a packaging material that minimizes reduction in the lamination strength between a sealant layer and a metal foil layer caused by an electrolytic solution, and has sufficient electrolytic resistance. In this packaging material, a sealant layer and a metal foil layer are adhered via a layer made of an adhesive (adhesive layer) containing a polyolefin resin containing a carboxyl group and a polyfunctional isocyanate compound.

CITATION LIST

Patent Literature

PTL 1: JP-A-2010-092703

SUMMARY OF THE INVENTION

Technical Problem

However, in the packaging material described in PTL 1, good electrolytic resistance is not always exerted over a long period, and therefore further improvement in electrolytic resistance is sought for.

A corrosion prevention treatment layer may be provided to a sealant layer side surface of a metal foil layer for the purpose of imparting electrolytic resistance. In this case, the corrosion prevention treatment layer and the sealant layer are adhered via an adhesive layer.

However, as stated above, hydrofluoric acid or the like generated by hydrolysis of a lithium salt serving as an electrolyte tends to permeate between a corrosion prevention treatment layer and an adhesive layer and reduce lamination strength.

The present invention has been made in light of the above circumstances and has an object to provide a lithium battery packaging material exerting good electrolytic resistance over a long period.

Solution to Problem

The present invention has the following aspects.

A lithium battery packaging material of a first aspect of the present invention includes a laminate in which a substrate layer, a first adhesive layer, a metal foil layer, a corrosion prevention treatment layer, a second adhesive layer, and a sealant layer are laminated in this order. In the packaging material, the corrosion prevention treatment layer contains a rare-earth oxide and 1 to 100 parts by mass of phosphoric acid or phosphate relative to 100 parts by mass of the rare-earth oxide; the second adhesive layer is made of an adhesive composition containing an acid-modified polyolefin resin and a polyfunctional isocyanate compound; and in an infrared absorption spectrum of the second adhesive layer, a ratio (Y/X) between absorption (X) derived from C—H bending vibration of $CH_3$ and absorption (Y) derived from N—H bending vibration of a biuret bond is 0.3 or less.

A lithium battery packaging material of a second aspect of the present invention includes a laminate in which a substrate layer, a first adhesive layer, a metal foil layer, a corrosion prevention treatment layer, a second adhesive layer, and a sealant layer are laminated in this order. In the packaging material, the corrosion prevention treatment layer is formed by applying at least one treatment selected from the group consisting of degreasing treatment, hydrothermal synthesis treatment, anodic oxidation treatment, and chemical conversion treatment, to the metal foil layer; the second adhesive layer is made of an adhesive composition containing an acid-modified polyolefin resin and a polyfunctional isocyanate compound; and in an infrared absorption spectrum of the second adhesive layer, a ratio (Y/X) between absorption (X) derived from C—H bending vibration of $CH_3$ and absorption (Y) derived from N—H bending vibration of a biuret bond is 0.3 or less.

In the lithium battery packaging material of the first and second aspects of the present invention, the polyfunctional isocyanate compound may have an isocyanurate structure.

In the lithium battery packaging material of the first and second aspects of the present invention, the acid-modified polyolefin resin may be made of an acid-modified polyolefin resin obtained by graft-polymerizing at least one member selected from the group consisting of an unsaturated carboxylic acid, an unsaturated carboxylic acid anhydride, an unsaturated carboxylic acid ester, and an unsaturated carboxylic acid anhydride ester, onto a homopolymer of propylene or a copolymer of propylene and ethylene.

In the lithium battery packaging material of the first aspect of the present invention, the rare-earth oxide may be cerium oxide.

In the lithium battery packaging material of the first and second aspects of the present invention, the corrosion prevention treatment layer may further contain a cationic polymer.

In the lithium battery packaging material of the first and second aspects of the present invention, the cationic polymer may be at least one member selected from the group consisting of polyethyleneimine, an ion polymer complex composed of polyethyleneimine and a polymer having carboxylic acid, a primary amine-grafted acrylic resin obtained by graft-polymerizing a primary amine onto a main acrylic skeleton, polyallylamine or a derivative thereof, and aminophenol.

In the lithium battery packaging material of the first and second aspects of the present invention, the adhesive composition may further contain an organic metal catalyst containing at least one metal selected from the group consisting of tin, titanium, and zirconium.

Advantageous Effects of the Invention

The lithium battery packaging material of the first and second aspects of the present invention is capable of exerting improved electrolytic resistance over a longer period.

DETAILED DESCRIPTION OF REPRESENTATIVE EMBODIMENTS

First Embodiment

Hereinafter is described a lithium battery packaging material (hereinafter simply referred to as "packaging material") 10 shown in FIG. 1, as a lithium battery packaging material according to a first embodiment of the present invention. It is noted that this First Embodiment and the other embodiments and aspect are representative of the invention, and the invention should not be limited to only these embodiments.

Figure 1:
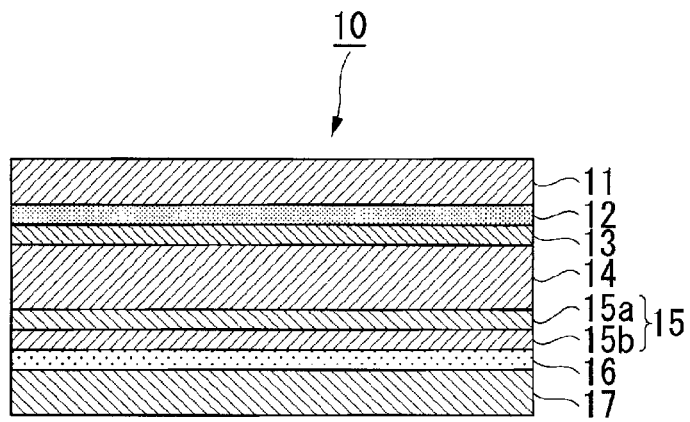
FIG. 1 is a cross-sectional view illustrating an example of a lithium battery packaging material according to a first embodiment of the present invention.

As shown in FIG. 1, the packaging material 10 according to the present embodiment is configured by a laminate in which a substrate layer 11, a first adhesive layer 12, a single-layer corrosion prevention treatment layer 13, a metal foil layer 14, a two-layer corrosion prevention treatment layer 15, a second adhesive layer 16, and a sealant layer 17 are laminated in this order.

In the packaging material 10, the substrate layer 11 is used as an outermost layer and the sealant layer 17 as an innermost layer.

[Substrate Layer]

The substrate layer 11 serves to impart heat resistance in a heat sealing process in producing a lithium battery, and minimize generation of pinholes that can occur during a forming process and distribution, for example. In particular, the substrate layer 11 also imparts abrasion resistance, chemical resistance, insulation properties, and the like to packaging materials for large-scale application lithium batteries.

As the substrate layer 11, a resin film formed of a resin having insulating properties is preferably used.

Examples of the resin film include stretched or unstretched films, such as a polyester film, a polyamide film, a polypropylene film, and the like.

The substrate layer 11 may be structured by a single layer or two or more layers. For example, the substrate layer 11 may be a single-layer resin layer formed of any one of the above-mentioned resin films or may be a resin layer having a multilayer structure in which two or more above-mentioned resin films are laminated. These resin layers can include, for example, a stretched or an unstretched polyamide film, a stretched or unstretched polyester film, a two-layer film of a stretched polyamide film and a stretched polyester film, and the like.

As the substrate layer 11, from the viewpoint of good formability and heat resistance, a stretched polyamide film is preferable. Also, as the substrate layer 11, from the viewpoint of good acid resistance, a stretched polyester film is preferable. Also, as the substrate layer 11, from the viewpoint of more easily achieving improvements in formability, heat resistance, and acid resistance, a laminated film of a stretched polyamide film and a stretched polyester film is preferable.

From the viewpoint of formability, heat resistance, pinhole resistance, and insulating properties, the substrate layer 11 preferably has a thickness of 6 μm or more and more preferably 10 μm or more. In addition, from the viewpoint of decreasing thickness and increasing heat radiation, the substrate layer 11 preferably has a thickness of 60 μm or less and more preferably 45 μm or less.

When the substrate layer 11 is a resin layer of a multilayer structure, the entire thickness is taken to be the thickness.

The substrate layer 11 may have an outermost surface (a surface opposite to the surface where the first adhesive layer 12 is provided) coated with various additives, such as an acid resistance imparting agent, a flame retardant, a slip agent, an antiblocking agent, an antioxidant, a light stabilizer, and a tackifier.

Examples of the acid resistance imparting agent include polyvinylidene chloride, a vinylidene chloride-vinyl chloride copolymer, maleic anhydride-modified polypropylene, a polyester resin, an epoxy resin, a phenol resin, a fluorine resin, cellulose ester, a urethane resin, an acrylic resin, and the like.

Examples of the slip agent include a fatty acid amide, such as oleic acid amide, erucic acid amide, stearic acid amide, behenic acid amide, ethylenebisoleic acid amide, and ethylenebiserucic acid amide, or the like.

As the antiblocking agent, various filler-based antiblocking agents, such as silica, are preferable.

These additives may be used singly or in combination of two or more.

[First Adhesive Layer]

The first adhesive layer 12 serves to adhere the substrate layer 11 to the metal foil layer 14 on which the corrosion prevention treatment layer 13 is formed.

The first adhesive layer 12 is formed using a known adhesive used for laminating a resin film and a metal foil. Examples of the adhesive include a polyurethane-based adhesive containing a main resin composed of a polyol, such as polyester polyol, polyether polyol, acrylic polyol, or carbonate polyol, or a curing agent composed of a bifunctional or more isocyanate compound. The curing agent is permitted to act on the main resin to form a polyurethane resin.

Usable polyester polyols include a compound obtained by reacting at least one polybasic acid with at least one diol.

Polybasic acids that can be used include, for example, a dibasic acid including: aliphatic dibasic acid, such as succinic acid, glutaric acid, adipic acid, pimelic acid, suberic acid, azelaic acid, sebacic acid, or brassylic acid; and aromatic dibasic acid, such as isophthalic acid, terephthalic acid, or naphthalenedicarboxylic acid.

Diols that can be used include, for example: an aliphatic diol, such as ethylene glycol, propylene glycol, butanediol, neopentyl glycol, methylpentanediol, hexanediol, heptanediol, octanediol, nonanediol, decanediol, or dodecanediol; an alicyclic diol, such as cyclohexanediol or hydrogenated xylylene glycol; and an aromatic diol, such as xylylene glycol.

The polyester polyol includes a polyester urethane polyol obtained by chain extension of the hydroxyl groups at both ends of the polyester polyol by use of an isocyanate compound itself, or by use of an adduct form, a biuret form or an isocyanurate form composed of at least one isocyanate compound.

Isocyanate compounds that can be used include, for example, a diisocyanate, such as 2,4- or 2,6-tolylene diisocyanate (TDI) or a hydrogenated product thereof, crude TDI, xylylene diisocyanate (XDI) or a hydrogenated product thereof, hexamethylene diisocyanate (HDI), 4,4'-diphenylmethane diisocyanate (MDI) or a hydrogenated product thereof, crude MDI, methylene diisocyanate, isopropylene diisocyanate, lysine diisocyanate, 2,2,4- or 2,4,4-trimethylhexamethylene diisocyanate, 1,6-hexamethylene diisocyanate, methylcyclohexane diisocyanate, isophorone diisocyanate (IPDI), 4,4'-dicyclohexylmethane diisocyanate, and isopropylidene dicyclohexyl-4,4'-diisocyanate.

These isocyanate compounds may be used singly or in combination of two or more.

The polyether polyols that can be used include an ether polyol, such as polyethylene glycol or polypropylene glycol, and polyether urethane polyol on which an isocyanate compound mentioned above is acted as a chain extender.

Acrylic polyols that can be used include a copolymer having poly(meth)acrylic acid as a main component. The copolymer includes a copolymer obtained by copolymerizing: hydroxyl group-containing monomers, such as 2-hydroxyethyl (meth)acrylate and 2-hydroxypropyl (meth)acrylate; alkyl (meth)acrylate monomers having a methyl group, an ethyl group, an n-propyl group, an i-propyl group, an n-butyl group, an i-butyl group, a t-butyl group, a 2-ethylhexyl group, and a cyclohexyl group as an alkyl group; amide group-containing monomers, such as (meth)acrylamide, N-alkyl (meth)acrylamide, N,N-dialkyl (meth)acrylamide (having a methyl group, an ethyl group, an n-propyl group, an i-propyl group, an n-butyl group, an i-butyl group, a t-butyl group, a 2-ethylhexyl group, a cyclohexyl group, etc. as an alkyl group), N-alkoxy (meth)acrylamide, N,N-dialkoxy (meth)acrylamide (having a methoxy group, an ethoxy group, a butoxy group, an isobutoxy group, etc. as an alkoxy group), N-methylol (meth)acrylamide, and N-phenyl (meth)acrylamide; glycidyl group-containing monomers, such as glycidyl (meth)acrylate, and allyl glycidyl ether; silane-containing monomers, such as (meth)acryloxypropyltrimethoxysilane, and (meth)acryloxypropyltriethoxysilane; and isocyanate group-containing monomers, such as (meth)acryloxypropyl isocyanate.

Carbonate polyols that can be used include a compound obtained by reaction of a carbonate compound with a diol.

Carbonate compounds that can be used include, for example, dimethyl carbonate, diphenyl carbonate, ethylene carbonate, and the like.

Diols that can be used include the diols mentioned above in explaining polyester polyols.

In addition, polycarbonate urethane polyol can be used that is obtained by chain extension of a hydroxyl group at an end of a carbonate polyol mentioned above by use of an isocyanate compound mentioned above.

These polyols may be used singly or by formulating two or more in accordance with required functions or performances.

The bifunctional or more isocyanate compound used as a curing agent includes the isocyanate compounds mentioned above in explaining polyester polyols.

The curing agent is formulated in an amount of preferably 1 to 100 parts by mass, and more preferably 5 to 50 parts by mass relative to 100 parts by mass of a main resin. If the amount is less than 1 part by mass, there is a concern that the performances in respect of adhesion and electrolytic resistance are not exerted. If the amount is more than 100 parts by mass, this can lead to existence of excessive isocyanate groups, resultantly causing materials to remain unreacted and adversely affect the adhesive film quality or the hardness.

To promote adhesion, the polyurethane-based adhesive may further be formulated with a carbodiimide compound, an oxazoline compound, an epoxy compound, a phosphorus compound, a silane coupling agent, and the like.

As the carbodiimide compound, mention can be made of N,N'-di-o-tolylcarbodiimide, N,N'-diphenylcarbodiimide, N,N'-di-2,6-dimethylphenylcarbodiimide, N,N'-bis(2,6-diisopropylphenyl)carbodiimide, N,N'-dioctyldecylcarbodiimide, N-triyl-N'-cyclohexylcarbodiimide, N,N'-di-2,2-di-t-butylphenylcarbodiimide, N-triyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, N,N'-di-p-tolylcarbodiimide, or the like. The carbodiimide compound includes a compound having a unit represented by the following general formula (1), a compound having a unit represented by the following formula (2), a compound having a unit represented by the following formula (3), or the like The epoxy compound includes, for example: diglycidyl ether of aliphatic diol, such as 1,6-hexanediol, neopentyl glycol, or polyalkylene glycol; polyglycidyl ether of aliphatic polyol, such as sorbitol, sorbitan, polyglycerol, pentaerythritol, diglycerol, glycerol, or trimethylolpropane; polyglycidyl ether of alicyclic polyol, such as cyclohexanedimethanol; diglycidyl ester or polyglycidyl ester of aliphatic or aromatic polycarboxylic acid, such as terephthalic acid, isophthalic acid, naphthalenedicarboxylic acid, trimellitic acid, adipic acid, or sebacic acid; diglycidyl ether or polyglycidyl ether of polyphenol, such as resorcinol, bis-(p-hydroxyphenyl)methane, 2,2-bis-(p-hydroxyphenyl)propane, tris-(p-hydroxyphenyl)methane, or 1,1,2,2-tetrakis(p-hydroxyphenyl)ethane; an N-glycidyl derivative of amine, such as N,N'-diglycidylaniline, N,N,N-diglycidyltoluidine, or N,N,N',N'-tetraglycidyl-bis-(p-aminophenyl)methane; a triglycidyl derivative of aminophenol; triglycidyl tris(2-hydroxyethyl)isocyanurate; triglycidyl isocyanurate; orthocresol epoxy; or phenolic novolak epoxy.

The phosphorus compound includes, for example, tris(2,4-di-t-butylphenyl)phosphite, tetrakis(2,4-di-t-butylphenyl) 4,4'-biphenylene-phosphonite, bis(2,4-di-t-butylphenyl) pentaerythritol-di-phosphite, bis(2,6-di-t-butyl-4-methylphenyl) pentaerythritol-di-phosphite, 2,2-methylenebis(4,6-di-t-butylphenyl) octyl phosphite, 4,4'-butylidene-bis(3-methyl-6-t-butylphenyl-di-tridecyl)phosphite, 1,1,3-tris(2-methyl-4-ditridecylphosphite-5-t-butyl-phenyl)butane, tris (mixed mono- and di-nonylphenyl)phosphite, tris (nonylphenyl)phosphite, 4,4'-isopropylidenebis (phenyl-dialkyl phosphite), or the like.

The silane coupling agent includes, for example, various silane coupling agents, such as vinyltriethoxysilane, vinyltris(β-methoxyethoxy)silane, γ-methacryloxypropyltrimethoxysilane, vinyltriacetoxysilane, γ-glycidoxypropylt-

[Chem. 1]

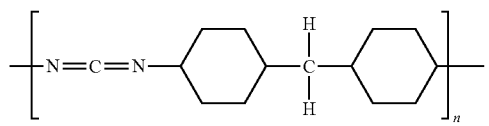

(1)

[Chem. 2]

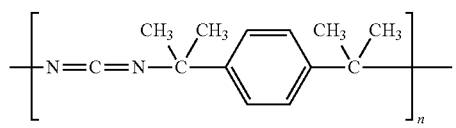

(2)

[Chem. 3]

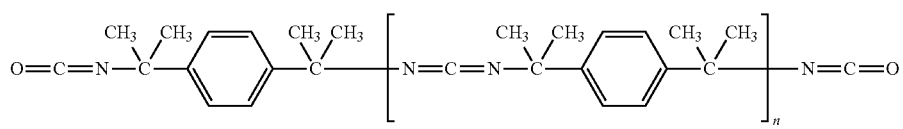

(3)

In the general formulae (1) to (3), n is an integer in a range of 2 to 30 and preferably in a range of 3 to 20.

As the oxazoline compound, mention can be made of, for example: a monooxazoline compound, such as 2-oxazoline, 2-methyl-2-oxazoline, 2-phenyl-2-oxazoline, 2,5-dimethyl-2-oxazoline, or 2,4-diphenyl-2-oxazoline; or a dioxazoline compound, such as 2,2'-(1,3-phenylene)-bis(2-oxazoline), 2,2'-(1,2-ethylene)-bis(2-oxazoline), 2,2'-(1,4-butylene)-bis(2-oxazoline), or 2,2'-(1,4-phenylene)-bis(2-oxazoline).

rimethoxy-silane, γ-glycidoxypropyltriethoxysilane, β-(3,4-epoxycyclohexyl) ethyltrimethoxysilane, γ-chloropropylmethoxysilane, vinyltrichlorosilane, γ-mercaptopropyltrimethoxysilane, γ-aminopropyltriethoxysilane, and N-β(aminoethyl)-γ-aminopropyltrimethoxysilane.

The adhesive may be formulated with other various additives and stabilizers in accordance with the performances required for the adhesive.

The first adhesive layer 12 has a thickness preferably in the range of 1 to 10 and more preferably in the range of 3 to 5 µm. If the thickness is 1 µm or more, the lamination strength as an adhesive is improved. If the thickness is 10 µm or less, when the packaging material 10 is cold-formed as a deep-drawn product, lifting between the substrate layer 11 and the metal foil layer 14 in an electrolytic atmosphere can be sufficiently inhibited in drawn corners of the deep-drawn product.

[Metal Foil Layer]

The metal foil layer 14 has water vapor barrier properties for helping to lessen or even preventing entrance of moisture into the battery. The metal foil layer 14 also has ductility exerted in deep drawing.

As the metal foil layer 14, various metal foils, such as of aluminum and stainless steel, can be used. From the viewpoint of weight (specific gravity), moisture barrier properties, processability, and cost, an aluminum foil is preferable. A metal foil layer formed of an aluminum foil is also referred to as "aluminum foil layer".

As the aluminum foil to serve as the metal foil layer 14, a known flexible aluminum foil can be used. From the viewpoint of pinhole resistance and ductility during forming, an aluminum foil containing iron is preferable. The iron content in the aluminum foil (100 mass %) per 100 mass % total mass of the aluminum foil is preferably in the range of 0.1 to 9.0 mass % and more preferably in the range of 0.5 to 2.0 mass %. If the iron content is not less than the lower limit (0.1 mass %), pinhole resistance and ductility are improved. If the iron content is not more than the upper limit (9.0 mass %), flexibility is improved.

From the viewpoint of barrier properties, pinhole resistance, and processability, the aluminum foil layer has a thickness preferably in the range of 9 to 200 µm and more preferably in the range of 15 to 100 µm.

Although an untreated aluminum foil can be used for the metal foil layer 14, a degreased aluminum foil is preferably used. The degreasing treatment can be roughly classified into wet degreasing treatment and dry degreasing treatment.

The wet degreasing treatment includes acid degreasing, alkaline degreasing, or the like. The acid used for the acid degreasing includes inorganic acid, such as sulfuric acid, nitric acid, hydrochloric acid, or hydrofluoric acid. These acids may be used singly or in combination of two or more. From the viewpoint improving etching effects of the aluminum foil, various metal salts may be formulated, as needed, as a supply source of iron (III) ions, cerium (III) ions, or the like. The alkali used for alkaline degreasing includes, for example, a strong etching type alkali, such as sodium hydroxide. A weak alkali or alkali formulated with a surfactant may also be used. The wet degreasing treatment is carried out using an immersion method or a spraying method.

The dry degreasing treatment includes degreasing treatment in which a treatment time is extended in a step of annealing aluminum. Other than the degreasing treatment, frame treatment, corona treatment, and the like can be mentioned. Further, there can be used degreasing treatment of irradiating ultraviolet rays at a specific wavelength to use the generated active oxygen for oxidization/decomposition and removal of contaminants.

The aluminum foil may be degreased on one side or both sides thereof.

[Corrosion Prevention Treatment Layer]

The corrosion prevention treatment layers 13 and 15 are provided to help prevent corrosion of the metal foil layer 14 due to the electrolytic solution or hydrofluoric acid.

In the embodiment of the present invention, the corrosion prevention treatment layer 13 between the first adhesive layer 12 and the metal foil layer 14 is also referred to as "outer corrosion prevention treatment layer 13" and the corrosion prevention treatment layer 15 between the metal foil layer 14 and the second adhesive layer 16 as "inner corrosion prevention treatment layer 15".

The inner corrosion prevention treatment layer 15 contains a rare-earth oxide, and 1 to 100 parts by mass of phosphoric acid or phosphate relative to 100 parts by mass of the rare-earth oxide. The inner corrosion prevention treatment layer 15 preferably further contains at least one polymer selected from the group consisting of a cationic polymer and an anionic polymer. From the viewpoint of more improving electrolytic resistance and hydrofluoric acid resistance of the packaging material 10, the inner corrosion prevention treatment layer 15 particularly preferably contains a cationic polymer.

When a coating layer, such as the corrosion prevention treatment layer 13 or 15, is provided on the metal foil layer 14, a technique for improving adhesion at an interface between the metal foil layer 14 and the corrosion prevention treatment layer 13 or adhesion at an interface between the metal foil layer 14 and the corrosion prevention treatment layer 15 by use of a silane coupling agent may be generally used. However, depending on the type of functional group contained in the silane coupling agent to be used, a component contained in the corrosion prevention treatment layers described later can secondarily react with the silane coupling agent to adversely affect the originally intended reaction. Therefore, it is preferable that the corrosion prevention treatment layers 13 and 15 do not contain silane coupling agent.

As shown in FIG. 1, the inner corrosion prevention treatment layer 15 according to the present embodiment has a two-layer structure formed of a first inner corrosion prevention treatment layer 15a and a second inner corrosion prevention treatment layer 15b.

The first inner corrosion prevention treatment layer 15a contacts the metal foil layer 14 and contains a rare-earth oxide, and phosphoric acid or phosphate. The second inner corrosion prevention treatment layer 15b contacts the second adhesive layer 16 described later and contains at least one polymer selected from the group consisting of a cationic polymer and an anionic polymer.

The second inner corrosion prevention treatment layer 15b preferably contains a cationic polymer or an anionic polymer. From the viewpoint of more improving electrolytic resistance and hydrofluoric acid resistance of the packaging material 10, the second inner corrosion prevention treatment layer 15b particularly preferably contains a cationic polymer.

The rare-earth oxide includes, for example, cerium oxide, yttrium oxide, neodymium oxide, lanthanum oxide, or the like. Among them, cerium oxide is preferable from the viewpoint of electrolytic resistance.

When forming the first inner corrosion prevention treatment layer 15a, phosphoric acid or phosphate may be used as a dispersion stabilizer for dispersion stabilization of the rare-earth oxide, and the resultant compound of the stabilized rare-earth oxide in a sol state (rare-earth oxide sol) may be used. In the rare-earth oxide sol, fine particles of rare-earth oxide (e.g., particles having an average particle size of 100 nm or less) are dispersed in a liquid dispersion medium.

The liquid dispersion medium of the rare-earth oxide sol includes, for example, various solvents, such as an aqueous solvent, an alcohol-based solvent, a hydrocarbon-based solvent, a ketone-based solvent, an ester-based solvent, an ether-based solvent, and the like. An aqueous solvent is preferable.

The phosphoric acid or phosphate is expected not only to stabilize dispersion of the rare-earth oxide, but also to exert such performances as improving adhesion with a metal foil layer (in particular, an aluminum foil layer) by use of the aluminum chelating ability of the phosphoric acid, imparting electrolytic resistance by capturing aluminum ions that are eluted being effected by hydrofluoric acid (i.e., forming a passive state), improving a cohesive force of the first inner corrosion prevention treatment layer 15a owing to the tendency of the phosphoric acid to easily cause dehydration condensation at low temperatures, and the like. The improvement in the cohesive force is likely to impart good physical strength to the packaging material 10.

The phosphoric acid compound, such as phosphoric acid or phosphate, includes, for example, orthophosphoric acid, pyrophosphoric acid, metaphosphoric acid, or an alkali metal salt or an ammonium salt thereof. Besides them, various salts, such as aluminum phosphate and titanium phosphate, may be used. From the viewpoint of exhibiting functions, a condensed phosphoric acid, such as trimetaphosphoric acid, tetrametaphosphoric acid, hexametaphosphoric acid, ultrametaphosphoric acid, or an alkali metal salt or an ammonium salt (condensed phosphate) thereof is preferable.

In particular, when the first inner corrosion prevention treatment layer 15a is formed using the rare-earth oxide in a sol state (i.e., rare-earth oxide sol), a dispersion stabilizer having good reactivity at low temperatures is preferable in consideration of dry film-forming properties (i.e., drying performance and heat quantity). From this, as a salt to form a phosphate, sodium salt having good dehydration condensation at low temperatures is preferable. As the phosphoric acid compound, a water soluble salt is preferable.

The content of a phosphoric acid or a salt thereof is 1 to 100 parts by mass, preferably 5 to 50 parts by mass, and more preferably 5 to 20 parts by mass relative to 100 parts by mass of the rare-earth oxide. If the content of a phosphoric acid or a salt thereof is not less than the lower limit (1 part by mass), the stability of the rare-earth oxide sol is improved and the packaging material 10 having a sufficient function is obtained. In contrast, if the content of a phosphoric acid or a salt thereof is not more than the upper limit (100 parts by mass), the function of the rare-earth oxide sol is enhanced, thereby forming the first inner corrosion prevention treatment layer 15a with good performance for preventing corrosion due to the electrolytic solution.

Although not particularly limited, the thickness of the first inner corrosion prevention treatment layer 15a is preferably in the range of 0.01 to 10 μm.

A mass "a" per unit area of the first inner corrosion prevention treatment layer 15a is preferably in the range of 0.010 to 0.200 $g/m^2$ and more preferably in the range of 0.040 to 0.100 $g/m^2$. The mass "a" of less than the lower limit (0.010 $g/m^2$) can decrease the absolute quantity of the rare-earth oxide having corrosion prevention effect for the metal foil, such as an aluminum foil, and the phosphoric acid or the phosphate. Thus, electrolytic resistance and hydrofluoric acid resistance are unlikely to be obtained. On the other hand, if the mass "a" is more than the upper limit (0.200 $g/m^2$), sol-gel reaction in association with drying of the rare-earth oxide sol is unlikely to progress (i.e., sol-gel reaction is unlikely to progress due to insufficient heat quantity). Thus, the cohesive force of the rare-earth oxide sol is reduced, and the physical strength may be deteriorated when the packaging material is formed. Accordingly, if the mass "a" per unit area of the first inner corrosion prevention treatment layer 15a is within the above range, electrolytic resistance is retained and also the cohesive force of the rare-earth oxide sol is retained. In this way, the strength required for the packaging material is sufficiently imparted.

The cationic polymer serves as a compound having good electrolytic resistance and hydrofluoric acid resistance. The reason may be because fluorine ions are trapped with cationic groups (as an anion catcher) and the aluminum foil is prevented from being damaged.

The cationic polymer includes an amine-containing polymer, and specifically includes polyethyleneimine, an ion polymer complex composed of polyethyleneimine and a polymer having carboxylic acid, a primary amine-grafted acrylic resin obtained by graft-polymerizing a primary amine onto a main acrylic skeleton, polyallylamine or a derivative thereof, aminophenol, or the like. These cationic polymers may be used singly or in combination of two or more. Among them, polyallylamine or a derivative thereof is preferable.

The polymer having polyethyleneimine and a carboxylic acid forming an ion polymer complex includes a polycarboxylic acid (salt), such as polyacrylic acid or an ionic salt thereof, or a copolymer obtained by introducing a comonomer thereto, or a polysaccharide having a carboxyl group, such as carboxymethylcellulose or an ionic salt thereof.

Usable polyallylamine includes a homopolymer or a copolymer of allylamine, allylamine amidosulfate, diallylamine, dimethylallylamine, and the like. These amines may be free amines or may be amines stabilized by acetic acid or hydrochloric acid. Usable copolymer component includes maleic acid, sulfur dioxide, or the like. Further, polyallylamine obtained by partially methoxylating the primary amine and imparting thereto thermal crosslinking properties can also be used.

When using the aminophenol as well, the aminophenol can be used by partially methoxylating the primary amine and imparting thereto thermal crosslinking properties.

The cationic polymer preferably forms a crosslinking structure in the second inner corrosion prevention treatment layer 15b. The cationic polymer forming a crosslinking structure can improve water resistance of the packaging material 10.

For the cationic polymer to form a crosslinking structure, a crosslinker is used together with the cationic polymer when forming the second inner corrosion prevention treatment layer 15b. The crosslinker for forming a cationic polymer having a crosslinking structure includes, for example, at least one compound selected from the group consisting of a polyfunctional isocyanate compound, a glycidyl compound, a compound having a carboxyl group, and a compound having an oxazoline group.

The polyfunctional isocyanate compound includes, for example: the diisocyanates mentioned above in explaining the first adhesive layer 12; a polyisocyanate, such as an adduct form obtained by reacting these diisocyanates with a polyhydric alcohol, such as trimethylolpropane, a biuret form obtained by reacting the diisocyanates with water, and an isocyanurate form as a trimer; or blocked polyisocyanate obtained by blocking these polyisocyanates with an alcohol, a lactam, an oxime, or the like.

The glycidyl compound includes, for example: an epoxy compound obtained by permitting epichlorohydrin to act on a glycol, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, or neopentyl glycol; an epoxy compound obtained by permitting epichlorohydrin to act on a polyhydric alcohol, such as glycerin, polyglycerin, trimethylolpropane, pentaerythritol, or sorbitol; or an epoxy compound obtained by permitting epichlorohydrin to act on a dicarboxylic acid, such as phthalic acid, terephthalic acid, oxalic acid, or adipic acid.

As the compound having a carboxyl group, various aliphatic or aromatic dicarboxylic acids, and the like, as well as poly(meth)acrylic acid, and alkaline (earth) metal salt of poly(meth)acrylic acid may be used, for example.

As the compound having an oxazoline group, a low molecular weight compound having two or more oxazoline units may be used. When using a polymerizable monomer, such as isopropenyloxazoline, a compound obtained by copolymerizing the monomer with an acrylic monomer, such as (meth)acrylic acid, (meth)acrylic alkyl ester, and hydroxyalkyl (meth)acrylate, can be used.

1 to 50 parts by mass of these crosslinkers is appropriately formulated relative to 100 parts by mass of the cationic polymer. If the crosslinker is formulated in an amount less than the lower limit (1 part by mass), a poor crosslinking structure is formed. In contrast, if the crosslinker is formulated in an amount more than the upper limit (50 parts by mass), there is a concern that the pot life of the coating liquid may be reduced.

When the cationic polymer is a polyallylamine derivative obtained by methoxycarbonylating the primary amine of a polyallylamine, the cationic polymer has thermal crosslinking properties. Therefore, the cationic polymer, although not formulated with a crosslinker, is regarded as substantially equivalent to a crosslinker-formulated cationic polymer. As a method of crosslinking the cationic polymer, other than the method using a crosslinker as described above, a method of forming a crosslinking structure, such as an ionic crosslink, using a titanium or zirconium compound as a crosslinker may be used.

Crosslinkers may be used singly or in combination of two or more.

Further, a crosslinker may be used in combination with a silane coupling agent that is capable of selectively reacting an amine with a functional group and establishing siloxane bonds at crosslinking points. However, as described above, the inner corrosion prevention treatment layer 15 preferably contains no silane coupling agent.

The silane coupling agent includes, for example, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β(aminoethyl)-γ-aminopropyltrimethoxysilane, or γ-isocyanatepropyltriethoxysilane. In particular, in consideration of reactivity with a cationic polymer or a copolymer thereof, β-(3,4-epoxycyclohexyl)ethyltrimethoxysilane, γ-aminopropyltriethoxysilane, or γ-isocyanatepropyltriethoxysilane is preferable.

The anionic polymer serves as a compound that improves stability of the second inner corrosion prevention treatment layer 15b.

Generally, although not limited to the packaging material usage, when ionic contamination, in particular, of alkali metal ions and alkaline earth metal ions, such as sodium ions, is present in a protective layer provided intending, for example, to prevent corrosion of an aluminum foil due to a corrosive compound, the protective layer may be corroded starting from the ionic contamination.

If the second inner corrosion prevention treatment layer 15b contains an anionic polymer, the ionic contamination, such as of sodium ions contained in the rare-earth oxide sol described above, can be immobilized and durability of the packaging material can be improved.

The anionic polymer serves as a material with properties totally opposite to those of the cationic polymer described above. Specifically, such an anionic polymer includes a polymer having a carboxyl group, and includes poly(meth)acrylic acid or a salt thereof, or a copolymer containing (meth)acrylic acid or a salt thereof as a main component. The component used for the copolymer includes an alkyl (meth)acrylate monomer having a methyl group, an ethyl group, an n-propyl group, an i-propyl group, an n-butyl group, an i-butyl group, a t-butyl group, a 2-ethylhexyl group, or a cyclohexyl group as an alkyl group; an amide group-containing monomer, such as (meth)acrylamide, N-alkyl (meth)acrylamide, or N,N-dialkyl (meth)acrylamide (having a methyl group, an ethyl group, an n-propyl group, an i-propyl group, an n-butyl group, an i-butyl group, a t-butyl group, a 2-ethylhexyl group, a cyclohexyl group, etc. as an alkyl group), N-alkoxy (meth)acrylamide, or N,N-dialkoxy (meth)acrylamide (having a methoxy group, an ethoxy group, a butoxy group, an isobutoxy group, etc. as an alkoxy group), N-methylol (meth)acrylamide, or N-phenyl (meth)acrylamide; a hydroxyl group-containing monomer, such as 2-hydroxyethyl (meth)acrylate, or 2-hydroxypropyl (meth)acrylate; a glycidyl group-containing monomer, such as glycidyl (meth)acrylate, or allyl glycidyl ether; a silane-containing monomer, such as (meth)acryloxypropyltrimethoxysilane, or (meth)acryloxypropyltriethoxysilane; or isocyanate group-containing monomer, such as (meth)acryloxypropyl isocyanate.

The anionic polymer also preferably forms a crosslinking structure in the second inner corrosion prevention treatment layer 15b. The anionic polymer forming a crosslinking structure can improve water resistance of the packaging material 10.

For the anionic polymer to form a crosslinking structure, a crosslinker may be used together with the anionic polymer when forming the second inner corrosion prevention treatment layer 15b. The crosslinker forming an anionic polymer having a crosslinking structure includes the crosslinkers mentioned above in explaining the cationic polymer.

1 to 50 parts by mass of the crosslinker is appropriately formulated relative to 100 parts by mass of the anionic polymer. If the crosslinker is formulated less than the lower limit (1 part by mass), a poor crosslinking structure is formed. In contrast, if the crosslinker is formulated more than the upper limit (50 parts by mass), there is a concern that the pot life of the coating liquid is reduced.

Such crosslinkers may be used singly or in combination of two or more. Although the crosslinker may be used in combination with a silane coupling agent, the inner corrosion prevention treatment layer 15 preferably contains no silane coupling agent as described above. The silane coupling agent includes the silane coupling agents mentioned above in explaining the cationic polymer.

As shown in FIG. 1, the first inner corrosion prevention treatment layer 15a is directly laminated on the metal foil layer 14. The first inner corrosion prevention treatment layer 15a essentially has a structure of dense sol particles of the rare-earth oxide. On the other hand, the second inner corrosion prevention treatment layer 15b is laminated on the first inner corrosion prevention treatment layer 15a, while filling gaps of the first inner corrosion prevention treatment layer 15a containing the dense sol particles. That is, a material containing at least one polymer selected from the group consisting of a cationic polymer and an anionic polymer forming the second inner corrosion prevention treatment layer 15b (hereinafter, also referred to as "coating composition (b)") is coated onto the first inner corrosion prevention treatment layer 15a while the material permeates into the gaps of the first inner corrosion prevention treatment layer 15a to form the second inner corrosion prevention treatment layer 15b. In this case, by thermally crosslinking the coating composition (b) permeated in the gaps of the first inner corrosion prevention treatment layer 15a, the second inner corrosion prevention treatment layer 15b exerts the effect as a protective layer for protecting the first inner corrosion prevention treatment layer 15a.

In order that the second inner corrosion prevention treatment layer 15b more effectively plays the role as a protective layer for protecting the first inner corrosion prevention treatment layer 15a, the relationship of the mass "a" ($g/m^2$) per unit area of the first inner corrosion prevention treatment layer 15a with a mass "b" ($g/m^2$) per unit area of the second inner corrosion prevention treatment layer 15b preferably satisfies 2 b/a.

If the mass relationship (b/a) between the layers is outside the above range, the second inner corrosion prevention treatment layer 15b is capable of functioning as a protective layer for protecting the first inner corrosion prevention treatment layer 15a. However, in this case, the proportion of the second inner corrosion prevention treatment layer 15b laminated on the first inner corrosion prevention treatment layer 15a increases more than necessary, coupled with the first inner corrosion prevention treatment layer 15a filled in the gaps. The cationic polymer and/or the anionic polymer (at least one of the cationic polymer and the anionic polymer) in the second inner corrosion prevention treatment layer 15b may be present itself, or may be present being complexed, in the second inner corrosion prevention treatment layer 15b, with the rare-earth oxide and the phosphoric acid or the phosphate in the first inner corrosion prevention treatment layer 15a. When present being complexed, the electrolytic resistance and hydrofluoric acid resistance are likely to be expressed more effectively, compared to when present itself. Accordingly, if the mass relationship (b/a) between the layers is outside the above range, there is resultantly an increase in the proportion of the cationic polymer and/or the anionic polymer present itself without being complexed with the rare-earth oxide and the phosphoric acid or the phosphate in the first inner corrosion prevention treatment layer 15a. Therefore, the electrolytic resistance and the hydrofluoric acid resistance is not necessarily sufficiently exhibited but may be deteriorated. In addition, since the coating amount of the coating composition (b) increases, the coating composition is unlikely to be easily cured. To sufficiently cure the coating composition (b), the drying temperature may be set higher or the curing time may be set longer, however, the productivity may be resultantly reduced. From the viewpoint of improving electrolytic resistance and hydrofluoric acid resistance while maintaining productivity, the mass relationship (b/a) between the layers is preferably 2≥b/a, more preferably 1.5≥b/a 0.01, and particularly preferably 1.0≥b/a 0.1.

The above relationship (mass relationship), which is expressed on the basis of the masses of the layers, can be expressed in terms of the total thickness of the inner corrosion prevention treatment layer 15 if the specific gravities of the layers are available.

Materials for the outer corrosion prevention treatment layer 13 are not particularly limited as long as the materials are capable of preventing corrosion of the metal foil layer 14. However, the outer corrosion prevention treatment layer 13 preferably contains, for example, a rare-earth oxide, and 1 to 100 parts by mass of phosphoric acid or phosphate relative to 100 parts by mass of the rare-earth oxide. Further, the outer corrosion prevention treatment layer 13 may contain a cationic polymer and an anionic polymer and these polymers may form a crosslinking structure by a crosslinker. However, as described above, it is preferable that the outer corrosion prevention treatment layer 13 preferably does not contain a silane coupling agent.

As the rare-earth oxide, the phosphoric acid or phosphate, the cationic polymer, the anionic polymer, and the crosslinker, those which are mentioned above in explaining the inner corrosion prevention treatment layer 15, or the like can be used.

[Second Adhesive Layer]

The second adhesive layer 16 adheres the sealant layer 17 to the metal foil layer 14 on which the inner corrosion prevention treatment layer 15 is formed.

The second adhesive layer 16 according to the present embodiment is made of an adhesive composition containing an acid-modified polyolefin resin and a polyfunctional isocyanate compound.

The second adhesive layer 16 has the following characteristics.

Specifically, in an infrared absorption spectrum of the second adhesive layer 16, a ratio (Y/X) of absorption (Y) derived from N—H bending vibration of a biuret bond to absorption (X) derived from C—H bending vibration of $CH_3$ is 0.3 or less.

The C—H bending vibration of $CH_3$ has a peak (absorption peak) appearing in a region of 1380±10 $cm^{-1}$. The C—H bending vibration is derived from $CH_3$ in the acid-modified polyolefin resin contained in the adhesive composition. The absorption (X) derived from C—H bending vibration of $CH_3$ corresponds to the peak intensity appearing in the region of 1380±10 $cm^{-1}$.

On the other hand, N—H bending vibration of a biuret bond has a peak (absorption peak) appearing in a region of 1520±10 $cm^{-1}$. The N—H bending vibration is derived from a biuret bond in the second adhesive layer 16 made of an adhesive composition. The absorption (Y) derived from N—H bending vibration of the biuret bond corresponds to the peak intensity appearing in the region of 1520±10 $cm^{-1}$.

The biuret bond can be contained in the polyfunctional isocyanate compound, or can be generated by the secondary reaction (biuret reaction) of the polyfunctional isocyanate compound with water in the adhesive composition or the atmosphere.

Such a biuret bond is contained in the polyfunctional isocyanate compound when a biuret form is used mainly as the polyfunctional isocyanate compound. A biuret form may mingle as a byproduct in preparing an adduct form or an isocyanurate form. Therefore, if an adduct form or an isocyanurate form is used as the polyfunctional isocyanate compound, a biuret bond can be contained in the polyfunctional isocyanate compound.

The biuret reaction tends to occur during storage of the polyfunctional isocyanate compound or during aging treatment performed as needed in preparing the packaging material 10. The aging treatment aims to promote adhesion and is performed, for example, after the metal foil layer 14 and the substrate layer 11 are laminated to each other or after the metal foil layer 14 and the sealant layer 17 are laminated to each other. A biuret reaction is likely to be promoted as the storage temperature or the aging temperature increases.

As the proportion of biuret bond in the adhesive composition increases, the electrolytic resistance reduces, although the reason is not known.

Y/X is an index of a proportion of the biuret bond in the second adhesive layer 16. A smaller Y/X value means a lower proportion of the biuret bond contained in the polyfunctional isocyanate compound, or means that the secondary reaction (biuret reaction) of the polyfunctional isocyanate compound with water is more suppressed. If Y/X is 0.3 or less, the proportion of the biuret bond in the second adhesive layer 16 is reduced sufficiently and thus good electrolytic resistance is exerted over a long period.

Y/X can be controlled depending on the type of the polyfunctional isocyanate compound or by suppressing the secondary reaction (biuret reaction) of the polyfunctional isocyanate compound with the acid-modified polyolefin resin.

For example, by using a high purity isocyanurate form (i.e., isocyanurate form from which the biuret form as a byproduct is sufficiently removed) as the polyfunctional isocyanate compound, the Y/X value can be reduced. In preparing the packaging material 10, the secondary reaction can be suppressed by lowering the aging temperature, and thus the Y/X value can be reduced. Further, the secondary reaction can be suppressed by formulating an organic metal catalyst described later in the adhesive composition.

For example, Y/X can be obtained as follows.

Firstly, the packaging material 10 is immersed in in an alkaline solution (e.g., sodium hydroxide solution, etc.) to completely dissolve the metal foil layer 14. Then, the infrared absorption spectrum of the exposed surface of the second adhesive layer 16 remaining on the sealant layer 17 side is measured by a reflection method using an FT-IR (Fourier transform infrared spectroscopy). From the infrared absorption spectrum thus obtained, the absorption (X) derived from C—H bending vibration of $CH_3$ and the absorption (Y) derived from N—H bending vibration of a biuret bond are obtained to calculate their ratio (Y/X).

Figure 2:
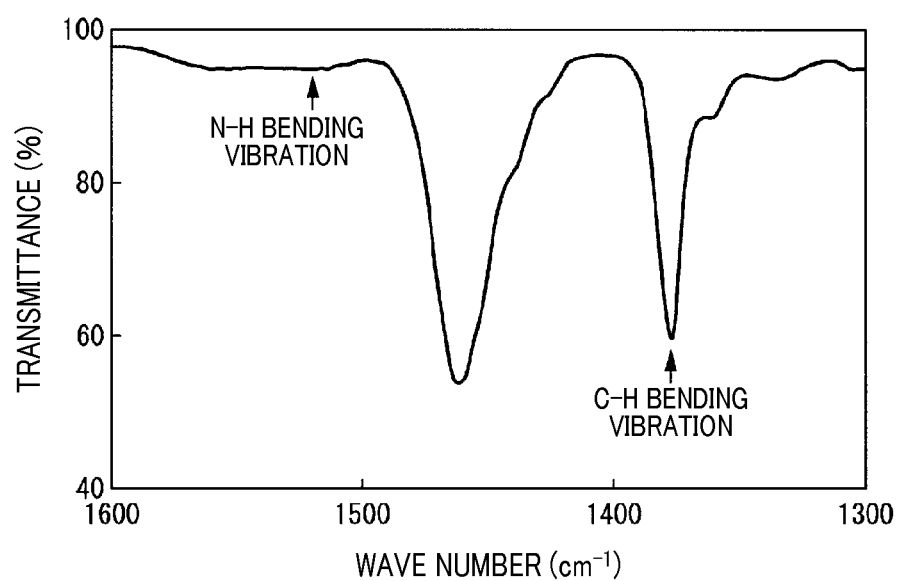
FIG. 2 shows an infrared absorption spectrum of a second adhesive layer made of an adhesive composition used in Examples A1 and A4.

With reference to FIG. 2, a specific method of obtaining the absorption (X) and the absorption (Y) will be described.

When an infrared absorption spectrum is measured by the method described above, an infrared absorption spectrum shown in FIG. 2, for example, is obtained.

The absorption (X) derived from C—H bending vibration of $CH_3$ is obtained from the following formula (1), and the absorption (Y) derived from N—H bending vibration of the biuret bond is obtained from the following formula (2).

$$\text{Absorption } (X) = (\text{Baseline transmittance}) - (\text{Peak transmittance around } 1380 \text{ cm}^{-1}) \quad (1)$$

$$\text{Absorption } (Y) = (\text{Baseline transmittance}) - (\text{Peak transmittance around } 1520 \text{ cm}^{-1}) \quad (2)$$

In the case shown in FIG. 2, the baseline transmittance is 100%, the peak transmittance around 1380 $cm^{-1}$ is 60%, and the peak transmittance around 1520 $cm^{-1}$ is 95.6%. Therefore, the absorption (X) derived from C—H bending vibration of $CH_3$ is 40 and the absorption (Y) derived from N—H bending vibration of the biuret bond is 4.4, thus Y/X is 0.11.

The acid-modified polyolefin resin contained in the adhesive composition is obtained by introducing an acidic group into a polyolefin resin. The acidic group includes a carboxyl group, a sulfonic acid group, or the like, and a carboxyl group is particularly preferable.

The acid-modified polyolefin resin obtained by introducing a carboxyl group into a polyolefin resin includes an acid-modified polyolefin resin obtained by graft-polymerizing at least one member selected from the group consisting of an unsaturated carboxylic acid, an unsaturated carboxylic acid anhydride, an unsaturated carboxylic acid ester, and an unsaturated carboxylic acid anhydride ester, onto a polyolefin resin in the presence of a radical initiator. Hereinafter, the unsaturated carboxylic acid, the unsaturated carboxylic acid anhydride, the unsaturated carboxylic acid ester, and the unsaturated carboxylic acid anhydride ester are also collectively referred to as "graft compound".

The polyolefin resin includes low density polyethylene, medium density polyethylene, high density polyethylene, ethylene-α olefin copolymer, homopolypropylene, block polypropylene, random polypropylene, propylene-α olefin copolymer, propylene-ethylene-α olefin copolymer (multi-component copolymer), or the like. Among them, homopolypropylene (a polymer of a propylene itself) or propylene-α olefin copolymer is preferable. As the propylene-α olefin copolymer, a copolymer of propylene and ethylene is preferable.

The unsaturated carboxylic acid includes acrylic acid, methacrylic acid, maleic acid, fumaric acid, itaconic acid, citraconic acid, tetrahydrophthalic acid, bicyclo[2,2,1]hept-2-ene-5,6-dicarboxylic acid, or the like.

The unsaturated carboxylic acid anhydride includes maleic anhydride, itaconic anhydride, citraconic anhydride, tetrahydrophthalic anhydride, bicyclo[2,2,1]hept-2-ene-5,6-dicarboxylic anhydride, or the like.

The unsaturated carboxylic acid or an acid anhydride ester thereof includes methyl acrylate, methyl methacrylate, ethyl methacrylate, butyl methacrylate, dimethyl maleate, monomethyl maleate, diethyl fumarate, dimethyl itaconate, diethyl citraconate, dimethyltetrahydrophthalic anhydride, bicyclo[2,2,1]hept-2-ene-5,6-dimethyl dicarboxylate, or the like.

The proportion of the graft compound in the acid-modified polyolefin resin is preferably 0.2 to 100 parts by mass relative to 100 parts by mass of polyolefin resin.

Temperature conditions of the graft reaction are preferably in the range of 50 to 250° C. and more preferably in the range of 60 to 200° C.

The reaction time depends on the preparation method, but when melt graft reaction by use of a twin screw extruder is concerned, the reaction time is preferably within an extruder residence time. Specifically, the reaction time is preferably in the range of 2 to 30 minutes and more preferably in the range of 5 to 10 minutes.

The graft reaction can be performed under normal pressure condition or may be performed under pressurized condition.

The radical initiator includes an organic peroxide. The organic peroxide includes, for example, alkyl peroxide, aryl peroxide, acyl peroxide, ketone peroxide, peroxy ketal, peroxycarbonate, peroxy ester, hydroperoxide, or the like. These organic peroxides can be selectively used as appropriate in accordance with the temperature condition and the reaction time. When melt graft reaction by use of a twin screw extruder stated above is concerned, alkyl peroxide, peroxy ketal, and peroxy ester are preferable, and di-t-butyl peroxide, 2,5-dimethyl-2,5-di-t-butylperoxy-hexyne-3, and dicumyl peroxide are more preferable.

The acid-modified polyolefin resin is preferably used in a solution state by being dissolved or dispersed in an organic solvent.

The organic solvent includes, for example: an aromatic organic solvent, such as toluene; an alicyclic organic solvent, such as cyclohexane; an ester organic solvent, such as ethyl acetate; or a ketone organic solvent, such as acetone.

The acid-modified polyolefin resin includes crystalline one, amorphous one, or the like, and can be used, depending on the characteristics required for the packaging material 10. Considering swelling properties, heat resistance, and solubility and dispersibility in an organic solvent of an electrolytic solution, a low crystalline acid-modified polyolefin resin is preferable.

The polyfunctional isocyanate compound contained in the adhesive composition includes the polyfunctional isocyanate compounds stated above as the crosslinker for forming a cationic polymer having a crosslinking structure, in explaining the inner corrosion prevention treatment layer 15, and in particular, an isocyanurate form is preferable.

As described above, the polyisocyanate includes an adduct form, a biuret form, an isocyanurate form, or the like. The adduct form is typically obtained by reacting a diisocyanate with a polyhydric alcohol, such as trimethylolpropane, and has a urethane bond. As described above, this urethane bond tends to have low resistance to an electrolytic solution and hydrofluoric acid. The biuret form is typically obtained by reaction of a diisocyanate with water and has a biuret bond. Since the biuret form has an absorption band in a region of $1520\pm10$ $cm^{-1}$, when the biuret form is used as the polyfunctional isocyanate compound, the absorption (Y) derived from N—H bending vibration of the biuret bond increases and Y/X also tends to increase.

Accordingly, as the polyfunctional isocyanate compound, the isocyanurate form (i.e., isocyanurate structure) is preferable. However, when Y/X is 0.3 or less, the adduct form or the biuret form may be used in combination.

The adhesive composition preferably further contains an organic metal catalyst. If the adhesive composition contains an organic metal catalyst, secondary reaction of the polyfunctional isocyanate compound with water (biuret reaction) may be inhibited. The reason for this is considered to be as follows.

An organic metal catalyst tends to promote reaction (urea reaction) performed one stage before biuret reaction. When the adhesive composition contains an organic metal catalyst, the excessive polyfunctional isocyanate compound contained in the adhesive composition reacts with urea. As a result, not the reaction for forming a biuret bond, but the reaction between the polyfunctional isocyanate compound and an amine obtained from carbamic acid or decarboxylation thereof is considered to be promoted. In this case, the carbamic acid is obtained by reaction of the polyfunctional isocyanate compound with water. In addition, a urea bond is likely to be formed more than a biuret bond, and the absorption (Y) derived from N—H bending vibration of a biuret bond is considered to be reduced.

The organic metal catalyst includes a compound containing one or more metal, such as tin, titanium, or zirconium. Specifically, the organic metal catalyst includes zirconium tetraacetylacetonate, zirconium tris(acetylacetonate)ethyl acetoacetate, dibutyltin dilaurate, or the like.

The content of the organic metal catalyst is preferably in the range of 0.1 to 1 part by mass relative to 100 parts by mass of the solid content of the adhesive composition (excluding the organic metal catalyst).

The adhesive composition may be formulated with various additives, such as a flame retardant, a slip agent, an antiblocking agent, an antioxidant, a light stabilizer, and a tackifier.

Commonly used adhesive for adhering a metal foil layer and a sealant layer may contain a silane coupling agent. This is because, by formulating a silane coupling agent, adhesion is promoted, adhesion strength is enhanced, and electrolytic resistance is improved. However, when an adhesive formulated with a silane coupling agent is used, there is a concern that the silane coupling agent secondarily reacts with a component other than the silane coupling agent contained in the adhesive layer to adversely affect the originally intended crosslinking reaction, depending on the functional group contained in the silane coupling agent. Therefore, it is preferable that the adhesive composition for forming the second adhesive layer 16 does not contain a silane coupling agent.

In the embodiment of the present invention, the second adhesive layer 16 is made of the adhesive composition stated above, so that the packaging material 10 having good electrolytic resistance is obtained. Thus, the adhesive composition does not have to be formulated with a silane coupling agent for the purpose of promoting adhesion. It is preferable that the adhesive composition does not contain silane coupling agent.

The second adhesive layer 16 preferably has a thickness in the range of 3 to 50 μm and more preferably in the range of 10 to 40 μm. If the second adhesive layer 16 has a thickness of not less than the lower limit (3 μm), good adhesion is likely to be obtained. If the second adhesive layer 16 has a thickness of not more than the upper limit (50 μm), the moisture content permeated from lateral end faces of the packaging material 10 is reduced.

[Sealant Layer]

The sealant layer 17 imparts sealing properties to the packaging material 10 by heat sealing.

Materials forming the sealant layer 17 include, for example, polyolefin resins or acid-modified polyolefin resins. These polyolefin resins and acid-modified polyolefin resins include the resins stated above in explaining the second adhesive layer 16.

The sealant layer 17 may be a single layer film or a multilayer film in which a plurality of layers are laminated. According to the required functions, the sealant layer 17 may be a multilayer film interposed by resins, such as an ethylene-cyclic olefin copolymer or polymethylpentene, from the viewpoint, for example, of imparting moisture barrier properties.

Further, the sealant layer 17 may be formulated with various additives, such as a flame retardant, a slip agent, an antiblocking agent, an antioxidant, a light stabilizer, a tackifier, and the like.

The sealant layer 17 preferably has a thickness in the range of 10 to 100 μm and more preferably in the range of 20 to 50 μm.

[Method of Preparing Lithium Battery Packaging Material]

The packaging material 10 shown in FIG. 1 can be prepared by a preparation method including the following steps (1) to (3), for example.

(1) A step of forming the outer corrosion prevention treatment layer 13 on one surface (first surface) of the metal foil layer 14, followed by bonding the substrate layer 11 via the first adhesive layer 12.

(2) A step of forming the inner corrosion prevention treatment layer 15 on the other surface (second surface, a surface opposite to the surface to which the substrate layer 11 is laminated) of the metal foil layer 14.

(3) A step of laminating the sealant layer 17 onto the inner corrosion prevention treatment layer 15 formed side of the metal foil layer 14 via the second adhesive layer 16.

Step (1):

The outer corrosion prevention treatment layer 13 is formed by coating a material for forming the outer corrosion prevention treatment layer 13 (hereinafter also referred to as "coating composition (c)") on one surface of the metal foil layer 14, followed by drying, curing, and baking.

A known method is used for the coating method, such as gravure coating, gravure reverse coating, roll coating, reverse roll coating, die coating, bar coating, kiss coating, comma coating, or the like.

When an aluminum foil is used as the metal foil layer 14, an untreated aluminum foil may be used, or an aluminum foil degreased by wet or dry degreasing treatment may be used as described above.

Subsequently, the substrate layer 11 is laminated onto the outer corrosion prevention treatment layer 13 via the first adhesive layer 12. As the lamination method, a known method can be used, such as dry lamination, non-solvent lamination, or wet lamination. Among them, dry lamination is preferably used.

As the adhesive for forming the first adhesive layer 12, the polyurethane-based adhesives mentioned in explaining the first adhesive layer 12 are preferable.

The amount of the adhesive for dry coating is preferably in the range of 1 to 10 $g/m^2$ and more preferably in the range of 3 to 7 $g/m^2$.

After laminating the substrate layer 11 onto one surface of the metal foil layer 14, aging (curing) treatment may be performed in a range of room temperature to 100° C. to promote adhesion.

Step (2):

The inner corrosion prevention treatment layer 15 is obtained by forming the first inner corrosion prevention treatment layer 15a on the other surface (a surface opposite to the surface on which the substrate layer 11 is laminated) of the metal foil layer 14, followed by forming the second inner corrosion prevention treatment layer 15b thereon.

Specifically, first, a material containing a rare-earth oxide and 1 to 100 parts by mass of phosphoric acid or phosphate relative to 100 parts by mass of the rare-earth oxide (hereinafter also referred to as "coating composition (a)") is coated onto one surface of the metal foil layer 14, followed by drying, curing and baking, thereby forming the first inner corrosion prevention treatment layer 15a. Subsequently, a material containing at least one polymer selected from the group consisting of a cationic polymer and an anionic polymer and, as needed, a crosslinker or the like to impart a crosslinking structure to the polymer (coating composition (b)) is coated onto the first inner corrosion prevention treatment layer 15a. Then, the resultant object is dried, cured and baked to form the second inner corrosion prevention treatment layer 15b.

The coating method includes the various coating methods mentioned above in explaining the step (1).

Step (3):

The method of laminating the sealant layer 17 to the inner corrosion prevention treatment layer 15 side of the metal foil layer 14 via the second adhesive layer 16 includes a dry process or a wet process.

In the dry process, the adhesive composition mentioned above regarding the second adhesive layer 16 is dry-laminated on the inner corrosion prevention treatment layer 15 and then the sealant layer 17 obtained by inflation or casting is further laminated thereon to prepare the packaging material 10. The second inner corrosion prevention treatment layer 15b may be formed in an in-line manner during the extrusion lamination. Then, for the purpose of improving adhesion between the coating composition (b) and the adhesive composition, heat treatment (aging treatment, heat lamination, etc.) may be applied. In the embodiment of the present invention, the packaging material 10 having good adhesiveness is obtained with the small heat quantity during extrusion lamination, by forming the layer structure as described above. If heat treatment, such as aging treatment, is performed, the aging temperature or the heat lamination temperature is preferably not excessively high, in preparation for the possible progress of the biuret reaction described above. Specifically, the aging temperature is preferably in the range of 25 to 45° C. and the heat lamination temperature is preferably in the range of 30 to 40° C.

In performing inflation or casting, a multilayer film can be prepared with the second adhesive layer 16 and the sealant layer 17, and the multilayer film can be laminated onto the inner corrosion prevention treatment layer 15 by heat lamination.

In the wet process, a dispersion of the adhesive composition for forming the second adhesive layer 16 is coated onto the inner corrosion prevention treatment layer 15, followed by evaporating the solvent at a predetermined temperature (a temperature not less than the melting point of the acid-modified polyolefin resin contained in the adhesive composition) to melt and soften the polymer, for baking. Then, the sealant layer 17 is laminated by heat treatment, such as heat lamination, to prepare the packaging material 10.

The coating method includes the various coating methods mentioned above in explaining the step (1).

[Advantageous Effects]

The packaging material of the present embodiment described above includes a laminate in which a substrate layer, a first adhesive layer, a single-layer corrosion prevention treatment layer (outer corrosion prevention treatment layer), a metal foil layer, a two-layer corrosion prevention treatment layer (inner corrosion prevention treatment layer), a second adhesive layer, and a sealant layer are laminated in this order.

The second adhesive layer is made of an adhesive composition containing an acid-modified polyolefin resin and a polyfunctional isocyanate compound, with the above-described Y/X being 0.3 or less.

As described above, since an electrolytic solution may permeate into the sealant layer, hydrofluoric acid and the like generated by hydrolysis of the electrolytic solution and a lithium salt as an electrolyte permeate between the corrosion prevention treatment layer and the adhesive layer.

However, the packaging material according to the present embodiment is provided with the second adhesive layer made of a specific adhesive composition, and thus good electrolytic resistance can be exerted over a long period and reduction in the lamination strength can be inhibited.

The inner corrosion prevention treatment layer contains a rare-earth oxide and phosphoric acid or phosphate. Such phosphoric acid or phosphate can not only disperse and stabilize the rare-earth oxide, but also exert an effect of inhibiting corrosion of the metal foil layer (in particular, aluminum foil layer). Further, adhesion of phosphoric acid or phosphate to the metal foil layer (in particular, aluminum foil layer) can also be improved, exerting synergy effects from the viewpoint of electrolytic resistance.

Further, when the inner corrosion prevention treatment layer has a multilayer structure formed of the first inner corrosion prevention treatment layer and the second inner corrosion prevention treatment layer described above, a corrosion prevention treatment layer with better hydrofluoric acid resistance and higher functions can be achieved. The reasons for this are considered to be as follows.

A cationic polymer and an anionic polymer are materials which are very effective from the viewpoint of trapping hydrofluoric acid. By adding a crosslinker, water resistance can also be improved. Accordingly, as shown in FIG. 1, the inner corrosion prevention treatment layer is provided with the second inner corrosion prevention treatment layer 15b containing a cationic polymer or an anionic polymer to further improve electrolytic resistance, hydrofluoric acid resistance, and water resistance.

However, the layer containing a cationic polymer or an anionic polymer does not serve to protect the metal foil from corrosion. To cope with this, as shown in FIG. 1, the inner corrosion prevention treatment layer 15 is formed into a multilayer structure including the first inner corrosion prevention treatment layer 15a containing a rare-earth oxide and phosphoric acid or phosphate, and the second inner corrosion prevention treatment layer 15b to thereby obtain an effect of corrosion prevention for the metal foil, such as an aluminum foil.

Modification of First Embodiment

The packaging material according to the first embodiment of the present invention is not limited to the embodiment described above. Although the inner corrosion prevention treatment layer 15 shown in FIG. 1 has a two-layer structure including the first inner corrosion prevention treatment layer 15a and the second inner corrosion prevention treatment layer 15b, the inner corrosion prevention treatment layer 15 may have a single-layer structure or a three- or more layer structure. For example, in a corrosion prevention treatment layer having a three-layer structure, layers can be laminated: in the order of a layer containing a rare-earth oxide and phosphoric acid or phosphate, a layer containing an anionic polymer, and a layer containing a cationic polymer; or in the order of a layer containing a rare-earth oxide and phosphoric acid or phosphate; a layer containing a cationic polymer; a layer containing an anionic polymer. Note that, the layer containing a rare-earth oxide and phosphoric acid or phosphate is positioned on the metal foil layer side.

In the packaging material 10 shown in FIG. 1, the corrosion prevention treatment layers 13 and 15 are provided on respective surfaces of the metal foil layer 14. Alternatively, the inner corrosion prevention treatment layer 15 may be provided to at least the second adhesive layer 16 side surface of the metal foil layer 14. In this case, the outer corrosion prevention treatment layer 13 does not have to be provided to the first adhesive layer 12 side surface of the metal foil layer 14.

Second Embodiment

Figure 6:
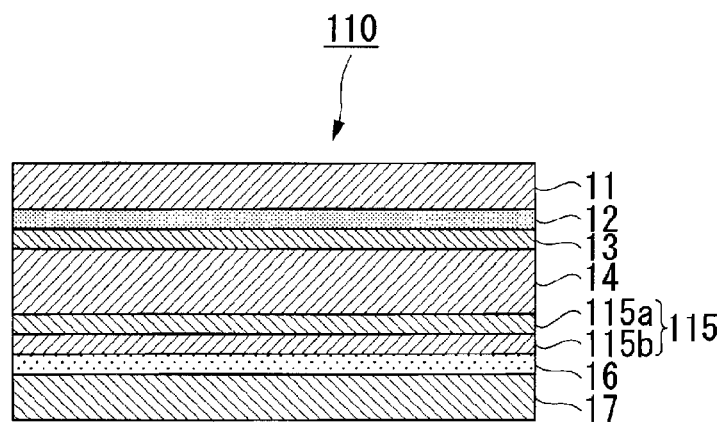
FIG. 6 is a cross-sectional view illustrating an example of a lithium battery packaging material according to a second embodiment of the present invention.

The following description sets forth a lithium battery packaging material 110 (hereinafter simply referred to as "packaging material") shown in FIG. 6, as an example of a lithium battery packaging material according to a second embodiment of the present invention. In FIG. 6, components identical with those of the first embodiment are given the same reference signs to omit or simplify description.

As shown in FIG. 6, the packaging material 110 according to the present embodiment includes a laminate in which the substrate layer 11, the first adhesive layer 12, the single-layer corrosion prevention treatment layer 13, the metal foil layer 14, a two-layer corrosion prevention treatment layer 115, the second adhesive layer 16, and the sealant layer 17 are laminated in this order.

The packaging material 110 uses the substrate layer 11 as the outermost layer and the sealant layer 17 as the innermost layer.

In the packaging material 110, the substrate layer 11, the first adhesive layer 12, the corrosion prevention treatment layer 13, the metal foil layer 14, and the sealant layer 17 have the same structure as in the first embodiment, and description is omitted.

The corrosion prevention treatment layer 115 of the present embodiment is different from the corrosion prevention treatment layer 15 of the first embodiment described above. The description below is focused on the corrosion prevention treatment layer 115.

[Corrosion Prevention Treatment Layer]

The corrosion prevention treatment layer 115 is provided to prevent corrosion of the metal foil layer 14 caused by an electrolytic solution or hydrofluoric acid.

In the embodiment of the present invention, the corrosion prevention treatment layer 115 between the metal foil layer 14 and the second adhesive layer 16 is also referred to as "inner corrosion prevention treatment layer 115".

The inner corrosion prevention treatment layer 115 is formed by applying at least one treatment selected from the group consisting of degreasing treatment, hydrothermal synthesis treatment, anodic oxidation treatment, and chemical conversion treatment, to the metal foil layer 14. The inner corrosion prevention treatment layer 115 preferably contains at least one polymer selected from the group consisting of a cationic polymer and an anionic polymer. From the viewpoint of improving electrolytic resistance and hydrofluoric acid resistance of the packaging material 110, the inner corrosion prevention treatment layer 115 particularly preferably contains a cationic polymer.

When a coating layer, such as the corrosion prevention treatment layer 13 or 115, is provided onto the metal foil layer 14, technique for improving adhesion at an interface between the metal foil layer 14 and the corrosion prevention treatment layer 13 or adhesion at an interface between the metal foil layer 14 and the corrosion prevention treatment layer 115 using a silane coupling agent may be generally used. However, depending on the functional group contained in the silane coupling agent to be used, a component contained in the corrosion prevention treatment layers described later and the silane coupling agent may cause secondary reaction which is likely to adversely affect the originally intended reaction. Therefore, it is preferable that the corrosion prevention treatment layers 13 and 115 do not contain a silane coupling agent.

Hereinafter, degreasing treatment, hydrothermal synthesis treatment, anodic oxidation treatment, and chemical conversion treatment are collectively referred to as "corrosion prevention treatment".

As shown in FIG. 6, the inner corrosion prevention treatment layer 115 of the present embodiment has a two-layer structure formed of a first inner corrosion prevention treatment layer 115a and a second inner corrosion prevention treatment layer 115b.

The first inner corrosion prevention treatment layer 115a is in contact with the metal foil layer 14 and is formed by applying the corrosion prevention treatment to the metal foil layer 14. The second inner corrosion prevention treatment layer 115b is in contact with the second adhesive layer 16 described later and contains at least one polymer selected from the group consisting of a cationic polymer and an anionic polymer.

The second inner corrosion prevention treatment layer 115b preferably contains a cationic polymer or an anionic polymer. From the viewpoint of more improving electrolytic resistance and hydrofluoric acid resistance of the packaging material 110, the second inner corrosion prevention treatment layer 115b particularly preferably contains a cationic polymer.

The degreasing treatment includes acid degreasing or alkaline degreasing. The acid degreasing includes the method described above which uses an inorganic acid, such as sulfuric acid, nitric acid, hydrochloric acid, or hydrofluoric acid, by itself, or uses an acid obtained by selectively mixing these acids. The acid degreasing uses an acid degreasing agent obtained by dissolving a fluorine-containing compound, such as monosodium ammonium difluoride, with an inorganic acid mentioned above. Use of the acid degreasing agent can not only exert the degreasing effect for the metal foil layer 14 but also form metal fluoride in a passive state. This method is effective from the viewpoint of hydrofluoric acid resistance. The alkaline degreasing includes a method in which sodium hydroxide or the like is used.

The hydrothermal synthesis treatment includes, for example, boehmite treatment in which a metal foil is immersed in boiling water to which triethanolamine has been added.

The anodic oxidation treatment includes, for example, alumite treatment.

The chemical conversion treatment includes an immersion type and a coating type. The immersion type chemical conversion treatment includes, for example, chromate treatment, zirconium treatment, titanium treatment, vanadium treatment, molybdenum treatment, calcium phosphate treatment, strontium hydroxide treatment, cerium treatment, ruthenium treatment, or various chemical conversion treatments of mixed phases thereof. On the other hand, the coating-type chemical conversion treatment includes a method of coating a coating agent having a corrosion prevention performance onto the metal foil layer 14.

Among these corrosion prevention treatments, if at least part of the corrosion prevention treatment layer is formed by any of hydrothermal synthesis treatment, anodic oxidation treatment, and chemical conversion treatment, degreasing treatment is preferably performed in advance. If a degreased aluminum foil is used as the metal foil layer 14, degreasing treatment at this point is not necessary in forming the inner corrosion prevention treatment layer 115.

The coating agent used for the coating type chemical conversion treatment contains trivalent chromium.

The coating agent used for the coating type chemical conversion treatment may contain at least one polymer selected from the group consisting of a cationic polymer and an anionic polymer.

In this case, both the first and second inner corrosion prevention treatment layers 115a and 115b contain a polymer.

The cationic polymer serves as a compound having good electrolytic resistance and hydrofluoric acid resistance. The reason may be because fluorine ions are trapped with cationic groups (as an anion catcher) and the aluminum foil is prevented from being damaged.

The cationic polymer includes an amine-containing polymer, and specifically includes polyethyleneimine, an ion polymer complex composed of polyethyleneimine and a polymer having carboxylic acid, a primary amine-grafted acrylic resin obtained by graft-polymerizing a primary amine onto a main acrylic skeleton, polyallylamine or a derivative thereof, aminophenol, and the like. These cationic polymers may be used singly or in combination of two or more. Among them, polyallylamine or a derivative thereof is preferable.

The polymer having polyethyleneimine and a carboxylic acid forming an ion polymer complex includes a polycarboxylic acid (salt), such as polyacrylic acid or an ionic salt thereof, or a copolymer obtained by introducing a comonomer thereto, or a polysaccharide having a carboxyl group, such as carboxymethylcellulose or an ionic salt thereof.

Usable polyallylamine includes a homopolymer or a copolymer of allylamine, allylamine amidosulfate, diallylamine, dimethylallylamine, and the like. These amines may be free amines or may be amines stabilized by acetic acid or hydrochloric acid. Usable copolymer component includes maleic acid, sulfur dioxide, or the like. Further, polyallylamine obtained by partially methoxylating the primary amine and imparting thereto thermal crosslinking properties can also be used.

When using the aminophenol as well, the aminophenol can be used by partially methoxylating the primary amine and imparting thereto thermal crosslinking properties.

The cationic polymer preferably forms a crosslinking structure in the second inner corrosion prevention treatment layer 115b. The cationic polymer forming a crosslinking structure can improve water resistance of the packaging material 110.

For the cationic polymer to form a crosslinking structure, a crosslinker is used together with the cationic polymer when forming the second inner corrosion prevention treatment layer 115b. The crosslinker for forming a cationic polymer having a crosslinking structure includes, for example, at least one compound selected from the group consisting of a polyfunctional isocyanate compound, a glycidyl compound, a compound having a carboxyl group, and a compound having an oxazoline group.

When the coating agent used for the coating type chemical conversion treatment contains a cationic polymer, the cationic polymer preferably forms a crosslinking structure in the first inner corrosion prevention treatment layer 115a as well. In order to form a cationic polymer having a crosslinking structure in the first inner corrosion prevention treatment layer 115a as well, a crosslinker only needs to be contained in the coating agent used for the coating type chemical conversion treatment.

The polyfunctional isocyanate compound includes, for example: the diisocyanates mentioned above in explaining the first adhesive layer 12; polyisocyanate, such as an adduct form obtained by reacting these diisocyanates with polyhydric alcohol, such as trimethylolpropane, a biuret form obtained by reacting the diisocyanates with water, and an isocyanurate form as trimer; and blocked polyisocyanate obtained by blocking these polyisocyanates with an alcohol, a lactam, an oxime, or the like.

The tlycidyl compound includes, for example: an epoxy compound obtained by permitting epichlorohydrin to act on a glycol, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, or neopentyl glycol; an epoxy compound obtained by permitting epichlorohydrin to act on a polyhydric alcohol, such as glycerin, polyglycerin, trimethylolpropane, pentaerythritol, or sorbitol; or an epoxy compound obtained by permitting epichlorohydrin to act on a dicarboxylic acid, such as phthalic acid, terephthalic acid, oxalic acid, or adipic acid.

As the compound having a carboxyl group, various aliphatic or aromatic dicarboxylic acids, and the like, as well as poly(meth)acrylic acids and alkaline (earth) metal salts of poly(meth)acrylic acids may be used, for example.

As the compound having an oxazoline group, a low molecular weight compound having two or more oxazoline units may be used. When using a polymerizable monomer, such as isopropenyl oxazoline, a compound obtained by copolymerizing the monomer with an acrylic monomer, such as (meth)acrylic acid, (meth)acrylic alkyl ester, and hydroxyalkyl (meth)acrylate, can be used.

1 to 50 parts by mass of these crosslinkers is appropriately formulated relative to 100 parts by mass of the cationic polymer. If the crosslinker is formulated in an amount less than the lower limit (1 part by mass), a poor crosslinking structure is formed. In contrast, if the crosslinker is formulated in an amount more than the upper limit (50 parts by mass), there is a concern that the pot life of the coating liquid may be reduced.

When the cationic polymer is a polyallylamine derivative obtained by methoxycarbonylating the primary amine of a polyallylamine, the cationic polymer has thermal crosslinking properties. Therefore, the cationic polymer, although not formulated with a crosslinker, is regarded as substantially equivalent to a crosslinker-formulated cationic polymer. As a method of crosslinking the cationic polymer, other than the method using a crosslinker as described above, a method of forming a crosslinking structure, such as an ionic crosslink, using a titanium or zirconium compound as a crosslinker may be used.

Crosslinkers may be used singly or in combination of two or more.

Further, a crosslinker may be used in combination with a silane coupling agent that is capable of selectively reacting an amine with a functional group and establishing siloxane bonds at crosslinking points. However, as described above, the inner corrosion prevention treatment layer 115 preferably contains no silane coupling agent.

The silane coupling agent includes, for example, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β(aminoethyl)-γ-aminopropyltrimethoxysilane, or γ-isocyanatepropyltriethoxysilane. In particular, in consideration of reactivity with a cationic polymer or a copolymer thereof, β-(3,4-epoxycyclohexyl)ethyltrimethoxysilane, γ-aminopropyltriethoxysilane, or γ-isocyanatepropyltriethoxysilane is preferable.

The anionic polymer serves as a compound that improves stability of the second inner corrosion prevention treatment layer 115b.

Generally, although not limited to the packaging material usage, when ionic contamination, in particular, of alkali metal ions and alkaline earth metal ions, such as sodium ions, is present in a protective layer provided intending, for example, to prevent corrosion of an aluminum foil due to a corrosive compound, the protective layer may be corroded starting from the ionic contamination.

If the second inner corrosion prevention treatment layer 115b contains an anionic polymer, the ionic contamination can be immobilized and durability of the packaging material can be improved.

The anionic polymer serves as a material with properties totally opposite to those of the cationic polymer described above. Specifically, such an anionic polymer includes a polymer having a carboxyl group, and includes poly(meth)acrylic acid or a salt thereof, or a copolymer containing (meth)acrylic acid or a salt thereof as a main component. The component used for the copolymer includes an alkyl (meth)acrylate monomer having a methyl group, an ethyl group, an n-propyl group, an i-propyl group, an n-butyl group, an i-butyl group, a t-butyl group, a 2-ethylhexyl group, or a cyclohexyl group as an alkyl group; an amide group-containing monomer, such as (meth)acrylamide, N-alkyl (meth)acrylamide, or N,N-dialkyl (meth)acrylamide (having a methyl group, an ethyl group, an n-propyl group, an i-propyl group, an n-butyl group, an i-butyl group, a t-butyl group, a 2-ethylhexyl group, a cyclohexyl group, etc. as an alkyl group), N-alkoxy (meth)acrylamide, or N,N-dialkoxy (meth)acrylamide (having a methoxy group, an ethoxy group, a butoxy group, an isobutoxy group, etc. as an alkoxy group), N-methylol (meth)acrylamide, or N-phenyl (meth)acrylamide; a hydroxyl group-containing monomer, such as 2-hydroxyethyl (meth)acrylate, or 2-hydroxypropyl (meth)acrylate; a glycidyl group-containing monomer, such as glycidyl (meth)acrylate, or allyl glycidyl ether; a silane-containing monomer, such as (meth)acryloxypropyltrimethoxysilane, or (meth)acryloxypropyltriethoxysilane; or isocyanate group-containing monomer, such as (meth)acryloxypropyl isocyanate.

The anionic polymer also preferably forms a crosslinking structure in the second inner corrosion prevention treatment layer 115b. The anionic polymer forming a crosslinking structure can improve water resistance of the packaging material 110.

For the anionic polymer to form a crosslinking structure, a crosslinker may be used together with the anionic polymer when forming the second inner corrosion prevention treatment layer 115b. The crosslinker forming an anionic polymer having a crosslinking structure includes the crosslinkers mentioned above in explaining the cationic polymer.

When an anionic polymer is contained in the coating agent used for the coating type chemical conversion treatment, the anionic polymer preferably forms a crosslinking structure also in the first inner corrosion prevention treatment layer 115a. In order that an anionic polymer has a crosslinking structure in the first inner corrosion prevention treatment layer 115a as well, a crosslinker may be contained in the coating agent used for the coating type chemical conversion treatment.

1 to 50 parts by mass of the crosslinker is appropriately formulated relative to 100 parts by mass of the anionic polymer. If the crosslinker is formulated less than the lower limit (1 part by mass), a poor crosslinking structure is formed. In contrast, if the crosslinker is formulated more than the upper limit (50 parts by mass), there is a concern that the pot life of the coating liquid is reduced.

Such crosslinkers may be used singly or in combination of two or more. Although the crosslinker may be used in combination with a silane coupling agent, the inner corrosion prevention treatment layer 115 preferably contains no silane coupling agent as described above. The silane coupling agent includes the silane coupling agents mentioned above in explaining the cationic polymer.

Although the inner corrosion prevention treatment layer 115 shown in FIG. 6 has a two-layer structure including the first inner corrosion prevention treatment layer 115a and the second inner corrosion prevention treatment layer 115b, the inner corrosion prevention treatment layer 115 may have a single-layer structure or may have a three- or more layer structure.

The inner corrosion prevention treatment layer 115 can include the following treatment layers (a) to (k).

(a) A multilayer obtained by laminating a layer formed of a cationic polymer on a layer formed by corrosion prevention treatment.

(b) A multilayer obtained by laminating a layer formed of an anionic polymer on a layer formed by corrosion prevention treatment.

(c) A multilayer obtained by laminating a layer formed of a cationic polymer and an anionic polymer on a layer formed by corrosion prevention treatment.

(d) A multilayer obtained by sequentially laminating a layer formed of a cationic polymer and a layer formed of an anionic polymer on a layer formed by corrosion prevention treatment.

(e) A multilayer obtained by sequentially laminating a layer formed of an anionic polymer and a layer formed of a cationic polymer on a layer formed by corrosion prevention treatment.

(f) A layer formed by corrosion prevention treatment and containing a cationic polymer.

(g) A layer formed by corrosion prevention treatment and containing an anionic polymer.

(h) A layer formed by corrosion prevention treatment and containing a cationic polymer and an anionic polymer.

(i) A layer formed by corrosion prevention treatment and containing neither a cationic polymer nor an anionic polymer.

(j) A multilayer obtained by laminating a layer formed of an anionic polymer on the layer (f).

(k) A multilayer obtained by laminating a layer formed of a cationic polymer on the layer (g).

In the treatment layers (a) to (e), the layer formed by corrosion prevention treatment may or may not contain a cationic polymer and/or an anionic polymer.

In each of the treatment layers (a) to (c), the layer formed by corrosion prevention treatment is in contact with the metal foil layer 14, and the layer formed of a cationic polymer and/or an anionic polymer is in contact with the second adhesive layer 16.

In the treatment layer (d), the layer formed by corrosion prevention treatment is in contact with the metal foil layer 14, and the layer formed of an anionic polymer is in contact with the second adhesive layer 16.

In the treatment layer (e), the layer formed by corrosion prevention treatment is in contact with the metal foil layer 14, and the layer formed of a cationic polymer is in contact with the second adhesive layer 16.

In each of the treatment layers (f) to (h), the layer formed by corrosion prevention treatment and containing a cationic polymer and/or an anionic polymer is in contact with both the metal foil layer 14 and the second adhesive layer 16.

In the treatment layer (i), the layer formed by corrosion prevention treatment and containing neither a cationic polymer nor an anionic polymer is in contact with both the metal foil layer 14 and the second adhesive layer 16.

In the treatment layer (j), the layer (f) is in contact with the metal foil layer 14, and the layer formed of an anionic polymer is in contact with the second adhesive layer 16.

In the treatment layer (k), the layer (g) is in contact with the metal foil layer 14, and the layer formed of a cationic polymer is in contact with the second adhesive layer 16.

For example, the treatment layers (a) to (c) are formed as follows.

Firstly, a surface of the metal foil layer 14 (a surface opposite to the surface on which the first adhesive layer 12 is formed, hereinafter is also referred to as "treatment surface") is subjected to at least one treatment selected from the group consisting of degreasing treatment, hydrothermal synthesis treatment, anodic oxidation treatment, and chemical conversion treatment to obtain the layer formed by corrosion prevention treatment. To obtain the layer formed by corrosion prevention treatment and containing a cationic polymer and/or an anionic polymer, the treatment surface of the metal foil layer 14 may be treated by the coating type chemical conversion treatment, using a coating agent containing trivalent chromium, at least one polymer selected from the group consisting of a cationic polymer and an anionic polymer, and, as needed, a crosslinker for imparting a crosslinking structure to the polymer and the like.

Subsequently, a material containing at least one polymer selected from the group consisting of a cationic polymer and an anionic polymer, and, as needed, a crosslinker for imparting a crosslinking structure to the polymer, and the like is coated onto the layer formed by corrosion prevention treatment, followed by drying, curing and baking, thereby obtaining the layer formed of a cationic polymer and/or an anionic polymer.

As the coating method, a known method is used, such as gravure coating, gravure reverse coating, roll coating, reverse roll coating, die coating, bar coating, kiss coating, comma coating, or the like.

For example, the treatment layer (d) is formed as follows.

Firstly, a treatment surface of the metal foil layer 14 is treated similarly to the treatment layers (a) to (c) to obtain the layer formed by corrosion prevention treatment.

Subsequently, a material containing a cationic polymer and, as needed, a crosslinker for imparting a crosslinking structure to the polymer, and the like is coated onto the layer formed by corrosion prevention treatment, followed by drying, curing and baking, thereby obtaining the layer formed of a cationic polymer.

Subsequently, a material containing an anionic polymer and, as needed, a crosslinker for imparting a crosslinking structure to the anionic polymer, and the like is coated onto the layer formed of a cationic polymer, followed by drying, curing and baking, thereby obtaining the layer formed of the anionic polymer.

The treatment layer (e) is formed by switching the order of forming the layer formed of a cationic polymer and the layer formed of an anionic polymer with each other, in the step of forming the treatment layer (d).

For example, the treatment layers (f) to (h) are formed as follows.

A coating agent containing trivalent chromium, at least one polymer selected from the group consisting of a cationic polymer and an anionic polymer, and, as needed, a crosslinker for imparting a crosslinking structure to the polymer, and the like is coated onto a treatment surface of the metal foil layer 14, followed by drying, curing and baking, thereby obtaining the layer formed by corrosion prevention treatment and containing a cationic polymer and/or an anionic polymer.

The treatment layer (i) is formed by using a coating agent containing trivalent chromium but containing neither a cationic polymer nor an anionic polymer, in the step of forming the treatment layers (f) to (h).

For example, the treatment layer (j) is formed as follows.

A material containing an anionic polymer, and, as needed, a crosslinker for imparting a crosslinking structure to the anionic polymer, and the like is coated onto the layer (f), followed by drying, curing and baking, thereby obtaining the layer formed of an anionic polymer.

For example, the treatment layer (k) is formed as follows.

A material containing a cationic polymer, and, as needed, a crosslinker for imparting a crosslinking structure to the cationic polymer, and the like is coated onto the layer (g), followed by drying, curing and baking, thereby obtaining the layer formed of a cationic polymer.

Of the corrosion prevention treatments described above, degreasing treatment, hydrothermal synthesis treatment, anodic oxidation treatment, and immersion type chemical conversion treatment, or, in particular, hydrothermal synthesis treatment, anodic oxidation treatment, and immersion type chemical conversion treatment dissolve the treatment surface of the metal foil layer 14 by use of a treatment agent to form a compound (e.g., an aluminum compound, such as boehmite and alumite when the metal foil layer 14 is an aluminum foil layer) having good corrosion resistance. Therefore, the obtained laminate resultantly has a co-continuous structure across the metal foil layer 14 and the layer formed by corrosion prevention treatment.

A mass per unit area of the inner corrosion prevention treatment layer 115 is preferably in the range of 0.005 to 2.000 g/m$^2$ and more preferably in the range of 0.010 to 0.100 g/m$^2$. If the mass is not less than the lower limit (0.005 g/m$^2$), the effect of inhibiting the metal foil layer 14 from being corroded by the electrolytic solution is readily obtained. If the mass exceeds the upper limit (2.000 g/m$^2$), the effect of inhibiting the metal foil layer 14 from being corroded by the electrolytic solution substantially remains unchanged.

Although an expression "mass per unit area" is used in the above description, the mass can be expressed in terms of the thickness of the inner corrosion prevention treatment layer 115 if the specific gravity is available.

The material for the outer corrosion prevention treatment layer 13 is not particularly limited as long as the material can prevent corrosion of the metal foil layer 14. The outer corrosion prevention treatment layer 13 preferably contains, for example, a rare-earth oxide, and 1 to 100 parts by mass of phosphoric acid or phosphate relative to 100 parts by mass of the rare-earth oxide. Further, the outer corrosion prevention treatment layer 13 may also contain a cationic polymer or an anionic polymer, and these polymers may form a crosslinking structure by a crosslinker. However, as described above, the outer corrosion prevention treatment layer 13 preferably contains no silane coupling agent.

The rare-earth oxide includes, for example, cerium oxide, yttrium oxide, neodymium oxide, lanthanum oxide, or the like. Among them, cerium oxide is preferable from the viewpoint of electrolytic resistance.

The phosphoric acid compound, such as phosphoric acid or phosphate, includes, for example, orthophosphoric acid, pyrophosphoric acid, metaphosphoric acid, or an alkali metal salt or an ammonium salt thereof. Besides them, various salts, such as aluminum phosphate, titanium phosphate, or the like may be used. From the viewpoint of exhibiting functions, a condensed phosphoric acid, such as trimetaphosphoric acid, tetrametaphosphoric acid, hexametaphosphoric acid, ultrametaphosphoric acid, or an alkali metal salt or an ammonium salt (condensed phosphate) thereof is preferable.

The cationic polymer, the anionic polymer, and the crosslinker include those which are mentioned above in explaining the inner corrosion prevention treatment layer 115.

[Second Adhesive Layer]

The second adhesive layer 16 adheres the sealant layer 17 with the metal foil layer 14 on which the inner corrosion prevention treatment layer 115 is formed. The second adhesive layer 16 of the present embodiment is the same as that in the first embodiment described above, and description is omitted.

[Method of Preparing Lithium Battery Packaging Material]

The packaging material 110 shown in FIG. 6 can be prepared by a preparation method including the following steps (1) through (3), for example.

(1) A step of forming the outer corrosion prevention treatment layer 13 on one surface (first surface) of the metal foil layer 14, followed by bonding the substrate layer 11 via the first adhesive layer 12.

(2) A step of forming the inner corrosion prevention treatment layer 115 on the other surface (second surface, a surface opposite to the surface to which the substrate layer 11 is laminated) of the metal foil layer 14.

(3) A step of laminating the sealant layer 17 onto the inner corrosion prevention treatment layer 115 formed side of the metal foil layer 14 via the second adhesive layer 16.

Step (1):

The outer corrosion prevention treatment layer 13 is formed by coating a material for forming the outer corrosion prevention treatment layer 13 on one surface of the metal foil layer 14, followed by drying, curing and baking.

The coating method includes the various coating methods mentioned above in explaining the method of forming the treatment layers (a) to (c).

When an aluminum foil is used as the metal foil layer 14, an untreated aluminum foil may be used, or a degreased aluminum foil of wet degreasing treatment or dry degreasing treatment may be used as described above.

Subsequently, the substrate layer 11 is laminated to the outer corrosion prevention treatment layer 13 via the first adhesive layer 12. The lamination method is the same as that in the first embodiment described above, and description is omitted.

Step (2):

The inner corrosion prevention treatment layer 115 is obtained by applying the corrosion prevention treatment described above and the like to the other surface (a surface opposite to the surface to which the substrate layer 11 is laminated) of the metal foil layer 14. Specific forming methods include those which are mentioned above in explaining the method of forming the treatment layers (a) to (c), (j), and (k).

The inner corrosion prevention treatment layer 115, if it has a single-layer structure or a three- or more layer structure, can be formed by the methods mentioned above in explaining the method of forming the treatment layers (d) to (i).

Step (3):

The method of laminating the sealant layer 17 to the inner corrosion prevention treatment layer 115 side of the metal foil layer 14 via the second adhesive layer 16 includes a dry process or a wet process.

In the dry process, the adhesive composition mentioned above in explaining the second adhesive layer 16 is dry-laminated on the inner corrosion prevention treatment layer 115 and the sealant layer 17 obtained by inflation or casting is further laminated to prepare the packaging material 110. The second inner corrosion prevention treatment layer 115b may be formed in an in-line manner during the extrusion lamination. Then, for the purpose of improving adhesion between the coating composition (b) and the adhesive composition, heat treatment (aging treatment, heat lamination, etc.) may be applied. In the embodiment of the present invention, the packaging material 110 having good adhesiveness is obtained with the small heat quantity during extrusion lamination, by forming the layer structure as described above. If heat treatment, such as aging treatment, is performed, the aging temperature or the heat lamination temperature is preferably not excessively high, in preparation for the possible progress of the biuret reaction described above. Specifically, the aging temperature is preferably in the range of 25 to 45° C. and the heat lamination temperature is preferably in the range of 30 to 40° C.

In performing inflation or casting, a multilayer film can be prepared with the second adhesive layer 16 and the sealant layer 17, and the multilayer film can be laminated on the inner corrosion prevention treatment layer 115 by heat lamination.

In the wet process, a dispersion of the adhesive composition for forming the second adhesive layer 16 is coated onto the inner corrosion prevention treatment layer 115, followed by evaporating the solvent at a predetermined temperature (a temperature not less than the melting point of the acid-modified polyolefin resin contained in the adhesive composition) to melt and soften the polymer, for baking. Then, the sealant layer 17 is laminated by heat treatment, such as heat lamination, to prepare the packaging material 10.

The coating method can include the various coating methods mentioned above in explaining the methods of forming the treatment layers (a) to (c).

[Actions and Effects]

The packaging material of the present embodiment described above includes a laminate in which a substrate layer, a first adhesive layer, a single-layer corrosion prevention treatment layer (outer corrosion prevention treatment layer), a metal foil layer, a two-layer corrosion prevention treatment layer (inner corrosion prevention treatment layer), a second adhesive layer, and a sealant layer are laminated in this order.

The second adhesive layer includes an adhesive composition containing an acid-modified polyolefin resin and a polyfunctional isocyanate compound, with the above-described Y/X being 0.3 or less.

As described above, since an electrolytic solution can permeate into the sealant layer, hydrofluoric acid and the like generated by hydrolysis of the electrolytic solution and a lithium salt as an electrolyte permeate between the corrosion prevention treatment layer and the adhesive layer.

However, the packaging material according to the present embodiment is provided with the second adhesive layer made of a specific adhesive composition, and thus good electrolytic resistance can be exerted over a long period and reduction in the lamination strength can be inhibited.

The inner corrosion prevention treatment layer is formed by applying at least one treatment selected from the group consisting of degreasing treatment, hydrothermal synthesis treatment, anodic oxidation treatment, and chemical conversion treatment to the metal foil layer. The layer formed through these corrosion prevention treatments serves to inhibit the metal foil layer from being corroded by hydrofluoric acid generated by reaction of the electrolytic solution and moisture. In addition, by improving the interaction with the metal foil layer, adhesion with the second adhesive layer is also improved.

Further, when the inner corrosion prevention treatment layer has a multilayer structure formed of the first inner corrosion prevention treatment layer and the second inner corrosion prevention treatment layer described above, a corrosion prevention treatment layer with better hydrofluoric acid resistance and higher functions can be achieved. The reasons for this are considered to be as follows.

A cationic polymer and an anionic polymer are materials which are very effective from the viewpoint of trapping hydrofluoric acid. By adding a crosslinker, water resistance can also be improved. Accordingly, as shown in FIG. 6, the inner corrosion prevention treatment layer is provided with the second inner corrosion prevention treatment layer 115*b* containing a cationic polymer or an anionic polymer to further improve electrolytic resistance, hydrofluoric acid resistance, and water resistance.

However, the layer containing a cationic polymer or an anionic polymer does not serve to protect the metal foil from corrosion. To cope with this, as shown in FIG. 6, the inner corrosion prevention treatment layer 115 is formed so as to have a multilayer structure including the second inner corrosion prevention treatment layer 115*b*, and the first inner corrosion prevention treatment layer 115*a* formed by applying the corrosion prevention treatment to the metal foil layer 14 to thereby obtain the effect of corrosion prevention for the metal foil, such as an aluminum foil. If the inner corrosion prevention treatment layer 115 does not have the multilayer structure shown in FIG. 6, or if it has a single-layer structure, the effects mentioned above are obtained, as long as the layer formed by applying the corrosion prevention treatment to the metal foil layer 14 contains a cationic polymer or an anionic polymer.

Modification of Second Embodiment

The packaging material according to the second embodiment of the present invention is not limited to the embodiment described above. The packaging material 110 shown in FIG. 6 includes the corrosion prevention treatment layers 13 and 115 provided on respective surfaces of the metal foil layer 14. However, the outer corrosion prevention treatment layer 13 does not have to be provided to the first adhesive layer 12 side surface of the metal foil layer 14 as long as the inner corrosion prevention treatment layer 115 is provided at least to the second adhesive layer 16 side surface of the metal foil layer 14.

EXAMPLES

Hereinafter, the present invention will be described in detail by way of examples. Note that the present invention is not limited to these examples.

Firstly, examples corresponding to the first embodiment will be described.

The materials used in the following examples and comparative examples are as follows.

[Materials Used]

<Corrosion Prevention Treatment Layer>

A-1: A cerium oxide sol obtained by formulating 10 parts by mass of condensed sodium phosphate relative to 100 parts by mass of cerium oxide, with the solid concentration being adjusted to 5 mass % using distilled water as a solvent.

B-1: A mixture containing 90 parts by mass of polyallylamine and 10 parts by mass of a glycidyl compound, with the solid concentration being adjusted to 5 mass % using distilled water as a solvent.

B-2: A mixture containing 90 parts by mass of polyacrylic acid and 10 parts by mass of a compound having an oxazoline group, with the solid concentration being adjusted to 5 mass % using distilled water as a solvent.

C-1: A mixture obtained by formulating, at a ratio of 70 to 30: a cerium oxide sol which is obtained by formulating 10 parts by mass of condensed sodium phosphate relative to 100 parts by mass of cerium oxide, with the solid concentration being adjusted to 5 mass % using distilled water as a solvent, with; a mixture containing 90 parts by mass of polyacrylic acid and 10 parts by mass of a compound having an oxazoline group, with the solid concentration being adjusted to 5 mass % using distilled water as a solvent.

<Second Adhesive Layer>

D-1: An adhesive composition obtained by formulating 10 parts by mass (solid content ratio) of hexamethylene diisocyanate having an isocyanurate structure relative to 100 parts by mass of a maleic anhydride-modified polyolefin resin dissolved in toluene.

D-2: An adhesive composition obtained by formulating 10 parts by mass (solid content ratio) of hexamethylene diisocyanate having a biuret structure relative to 100 parts by mass of a maleic anhydride-modified polyolefin resin dissolved in toluene.

D-3: An adhesive composition obtained by adding 1 part by mass (solid content ratio) of a zirconium-based reaction catalyst (zirconium tetraacetylacetonate), to a mixture that is obtained by formulating 10 parts by mass (solid content ratio) of hexamethylene diisocyanate having an isocyanurate structure relative to 100 parts by mass of a maleic anhydride-modified polyolefin resin dissolved in toluene.

Example A1

Firstly, C-1 was coated on one surface of a metal foil layer formed of an aluminum foil to form an outer corrosion prevention treatment layer, followed by coating a polyurethane-based adhesive (A525/A52 manufactured by Mitsui Chemicals Polyurethanes, Inc.) in a dry coating amount in the range of 4 to 5 mg/m² by dry lamination, thereby forming a first adhesive layer. Via the first adhesive layer, a substrate layer formed of a biaxially stretched polyamide film (with a thickness of 25 μm) was laminated.

Subsequently, A-1 was coated on the other surface (a surface opposite to the surface to which the substrate layer was laminated) of the metal foil layer, followed by drying to form a first inner corrosion prevention treatment layer. After that, B-1 was coated on the first inner corrosion prevention treatment layer, followed by drying to form a second inner corrosion prevention treatment layer.

A-1 and B-1 were coated by microgravure coating. After heating and drying both A-1 and B-1, the dry coating amount was ensured to be in the range of 70 to 100 mg/m².

Subsequently, D-1 was coated on the second inner corrosion prevention treatment layer in a dry coating amount in the range of 4 to 5 mg/m² by dry lamination, thereby forming a second adhesive layer. Via the second adhesive layer, a polypropylene film with a thickness of 40 μm was laminated as a sealant layer to provide a laminate, as shown in FIG. 1, having a layer structure of substrate layer 11/first adhesive layer 12/outer corrosion prevention treatment layer 13/metal foil layer 14/first inner corrosion prevention treatment layer 15a/second inner corrosion prevention treatment layer 15b/second adhesive layer 16/sealant layer 17.

The obtained laminate was aged at 40° C. for 10 days to obtain a packaging material.

<Measurement and Evaluation>

The obtained packaging material was cut into a strip of 100×15 mm size for use as a sample for measurement and evaluation. Then, the sample was measured for an infrared absorption spectrum and evaluated for electrolytic resistance, as shown below.

(Measurement of Infrared Absorption Spectrum)

The sample was immersed in a sodium hydroxide solution to completely dissolve the metal foil layer formed of an aluminum foil. Then, the infrared absorption spectrum of the exposed surface of the second adhesive layer remaining on the sealant layer side was measured by a reflection method, using an FT-IR (Fourier transform infrared spectroscopy). The measurement is shown in FIG. 2 as an infrared absorption spectrum of the second adhesive layer made of an adhesive composition used in Example A1 and Example A4 described later. From the obtained infrared absorption spectrum, absorption (X) derived from C—H bending vibration of $CH_3$ and absorption (Y) derived from N—H bending vibration of a biuret bond were calculated using the formulae (1) and (2) to calculate the ratio (Y/X). The results are shown in Table 2.

$$\text{Absorption } (X) = (\text{Baseline Transmittance}) - (\text{Peak Transmittance around } 1380 \text{ cm}^{-1}) \quad (1)$$

$$\text{Absorption } (Y) = (\text{Baseline Transmittance}) - (\text{Peak Transmittance around } 1520 \text{ cm}^{-1}) \quad (2)$$

In FIG. 2 and FIGS. 3 to 5 referred to later, the baseline transmittance was 100%.

(Evaluation of Electrolytic Resistance)

An electrolytic solution was prepared by adjusting $LiPF_6$ to be 1 M in a solution of ethylene carbonate/diethyl carbonate/dimethyl carbonate=1/1/1 (mass ratio), and filled in a Teflon® vessel. After adding 1500 ppm of water to the prepared electrolytic solution, the sample was put in the solution in the vessel and the vessel was hermetically sealed, followed by storage at 85° for 4 hours, 1 week, 2 weeks, and 4 weeks. Then, the sample was taken out of the vessel for evaluation of delamination in the following criteria. The results are shown in Table 2. In Table 2, lamination strength is indicated in the upper row of the electrolytic resistance column and evaluation is indicated in the lower row. Where delamination occurred and lamination strength could not be measured is indicated as "delamination".

○ (Good):Lamination strength was 10 N/15 mm or more (crosshead speed was 300 mm/min.)

Δ (Not good):Lamination strength was 5 N/15 mm or more and less than 10 N/15 mm (crosshead speed was 300 mm/min.)

× (Poor): Lamination strength was less than 5 N/15 mm (crosshead speed was 300 mm/min.)

Examples A2 to A6, Comparative Examples A1 and A2

Figure 3:
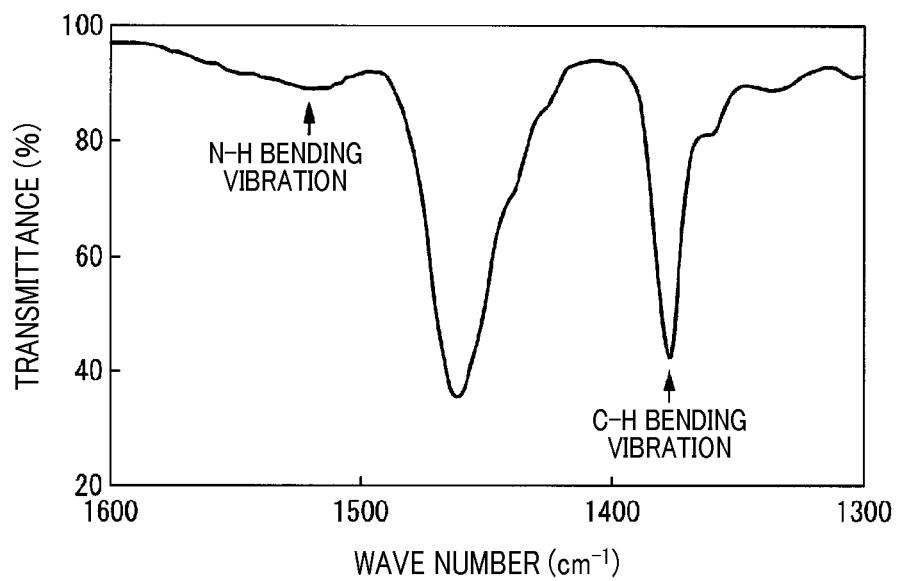
FIG. 3 shows an infrared absorption spectrum of a second adhesive layer made of an adhesive composition used in Examples A2 and A5.
Figure 4:
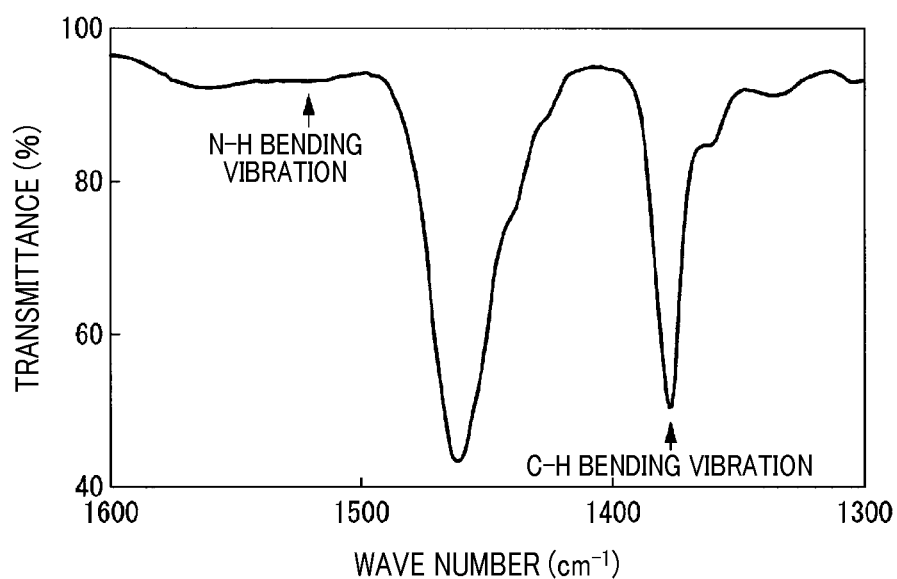
FIG. 4 shows an infrared absorption spectrum of a second adhesive layer made of an adhesive composition used in Examples A3 and A6.
Figure 5:
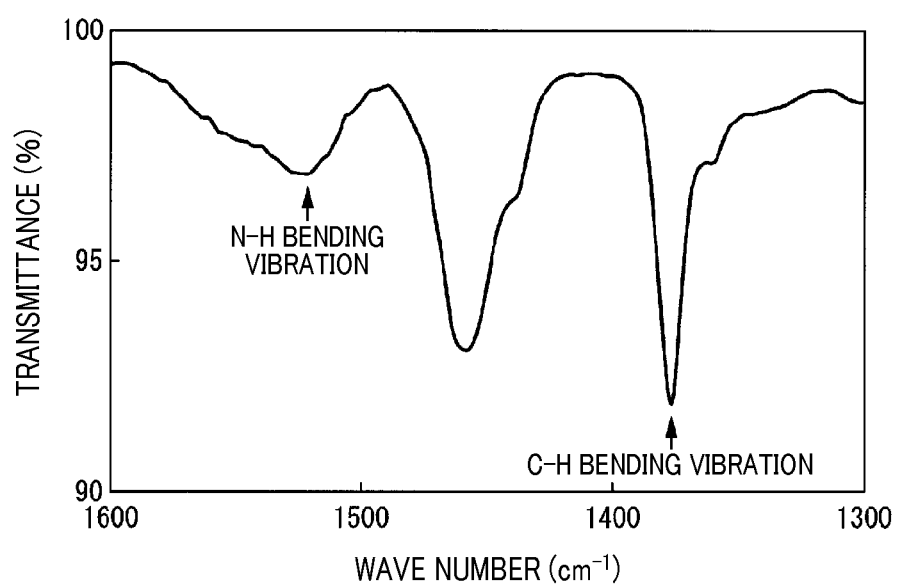
FIG. 5 shows an infrared absorption spectrum of a second adhesive layer made of an adhesive composition used in Comparative Examples A1 and A2.

A packaging material was prepared in the same manner as in Example A1, except for changing the materials used for forming the second inner corrosion prevention treatment layer and the second adhesive layer, and changing the aging temperature for aging the laminate as indicated in Table 1, for various measurements and evaluations. The results are shown in Table 2. The infrared absorption spectrum of the second adhesive layer made of the adhesive composition used in Examples A2 and A5 is shown in FIG. 3. The infrared absorption spectrum of the second adhesive layer made of the adhesive composition used in Examples A3 and A6 is shown in FIG. 4. The infrared absorption spectrum of the second adhesive layer made of the adhesive composition used in Comparative Examples A1 and A2 is shown in FIG. 5.

TABLE 1

|  | First Inner Corrosion Prevention Treatment Layer | Second Inner Corrosion Prevention Treatment Layer | Second Adhesive Layer | Aging Temperature (° C.) |
| --- | --- | --- | --- | --- |
| Example A1 | A-1 | B-1 | D-1 | 40 |
| Example A2 | A-1 | B-1 | D-1 | 60 |
| Example A3 | A-1 | B-1 | D-3 | 40 |
| Example A4 | A-1 | B-2 | D-1 | 40 |
| Example A5 | A-1 | B-2 | D-1 | 60 |
| Example A6 | A-1 | B-2 | D-3 | 40 |
| Comparative Example A1 | A-1 | B-1 | D-2 | 40 |
| Comparative Example A2 | A-1 | B-2 | D-2 | 40 |

TABLE 2

|  | Absorption | | | Electrolytic Resistance Lamination Strength (N/15 Mm) | | | |
| --- | --- | --- | --- | --- | --- | --- | --- |
|  | (X) | (Y) | (Y/X) | 4 Hours | 1 Week | 2 Weeks | 4 Weeks |
| Example A1 | 40 | 4.4 | 0.11 | 15.3 ◯ | 12.1 ◯ | 11.1 ◯ | 10.2 ◯ |
| Example A2 | 57.6 | 10.9 | 0.19 | 15.2 ◯ | 13.1 ◯ | 10.9 ◯ | 10.2 ◯ |
| Example A3 | 49.6 | 6.9 | 0.14 | 14.3 ◯ | 12.2 ◯ | 11.8 ◯ | 10.4 ◯ |
| Example A4 | 40 | 4.4 | 0.11 | 12.4 ◯ | 8.6 Δ | 7.5 Δ | 7.0 Δ |
| Example A5 | 57.6 | 10.9 | 0.19 | 10.9 ◯ | 10.3 ◯ | 9.5 Δ | 8.5 Δ |
| Example A6 | 49.6 | 6.9 | 0.14 | 12.3 ◯ | 11.8 ◯ | 11.1 ◯ | 9.0 Δ |
| Comparative Example A1 | 8.1 | 3.1 | 0.38 | 13.3 ◯ | 3.2 X | Delamination | Delamination |
| Comparative Example A2 | 8.1 | 3.1 | 0.38 | 11.5 ◯ | 3.0 X | Delamination | Delamination |

As clearly seen from Table 2, the packaging materials obtained in Examples A1 to A6 exerted good electrolytic resistance over a long period. In Examples A2 and A5, the second adhesive layer was formed using the same adhesive composition as in Examples A1 and A4, but Y/X of the second adhesive layer was greater than in Examples A1 and A4.

This is considered to be because the aging temperature was higher than in Examples A1 and A4 and accordingly the biuret reaction progressed more than in Examples A1 and A4.

In contrast, the packaging materials obtained in Comparative Examples A1 and A2 where Y/X of the second adhesive layer was 0.38 exhibited insufficient lamination strength after one week of storage in the electrolytic solution, and caused delamination after 2 weeks, resulting in poor electrolytic resistance.

Then, examples corresponding to the second embodiment will be described.

The materials used in the examples and comparative examples are as follows.

[Materials Used]

<Corrosion Prevention Treatment Layer>

A-1: A layer formed by applying chromate treatment to a surface of the metal foil layer using a chromium compound, the surface being opposite to the surface where the substrate layer was laminated.

B-1: A mixture containing 90 parts by mass of polyallylamine and 10 parts by mass of a glycidyl compound, with the solid concentration being adjusted to 5 mass % using distilled water as a solvent.

C-1: A mixture obtained by formulating, at a ratio of 70 to 30: a cerium oxide sol obtained by formulating 10 parts by mass of condensed sodium phosphate relative to 100 parts by mass of cerium oxide, with the solid concentration being adjusted to 5 mass % using distilled water as a solvent; with a mixture containing 90 parts by mass of polyacrylic acid and 10 parts by mass of a compound having an oxazoline group, with the solid concentration being adjusted to 5 mass % using distilled water as a solvent.

<Second Adhesive Layer>

D-1: An adhesive composition obtained by formulating 10 parts by mass (solid content ratio) of hexamethylene dissociate having an isocyanurate structure relative to 100 parts by mass of a maleic anhydride-modified polyolefin resin dissolved in toluene.

D-2: An adhesive composition obtained by formulating 10 parts by mass (solid content ratio) of hexamethylene diisocyanate having a biuret structure relative to 100 parts by mass of a maleic anhydride-modified polyolefin resin dissolved in toluene.

D-3: An adhesive composition obtained by adding: 1 part by mass (solid content ratio) of a zirconium-based reaction catalyst (zirconium tetraacetylacetonate); to a mixture obtained by formulating 10 parts by mass (solid content ratio) of hexamethylene diisocyanate having an isocyanurate structure relative to 100 parts by mass of a maleic anhydride-modified polyolefin resin dissolved in toluene.

Example B1

Firstly, C-1 was coated on one surface of a metal foil layer formed of an aluminum foil to form an outer corrosion prevention treatment layer, followed by coating a polyurethane-based adhesive (A525/A52 manufactured by Mitsui Chemicals Polyurethanes, Inc.) in a dry coating amount in the range of 4 to 5 mg/m² by dry lamination, thereby forming a first adhesive layer. Via the first adhesive layer, a substrate layer formed of a biaxially stretched polyamide film (with a thickness of 25 μm) was laminated.

Subsequently, A-1 was formed on the other surface (a surface opposite to the surface laminated with the substrate layer) of the metal foil layer by applying chromate treatment, thereby forming an inner corrosion prevention treatment layer made of A-1 (first inner corrosion prevention treatment layer).

Subsequently, D-1 was coated on the inner corrosion prevention treatment layer in a dry coating amount in the range of 4 to 5 mg/m² by dry lamination, thereby forming a second adhesive layer. Via the second adhesive layer, a polypropylene film with a thickness of 40 μm was laminated as a sealant layer to obtain a laminate having a layer structure of substrate layer/first adhesive layer/outer corrosion prevention treatment layer/metal foil layer/inner corrosion prevention treatment layer/second adhesive layer/sealant layer.

The obtained laminate was aged at 40° C. for 10 days to obtain a packaging material.

<Measurement and Evaluation>

The obtained packaging material was cut into a strip of 100×15 mm size for use as a sample for measurement and evaluation. Then, the sample was measured for an infrared absorption spectrum and evaluated for electrolytic resistance, as shown below.

(Measurement of Infrared Absorption Spectrum)

Figure 7:
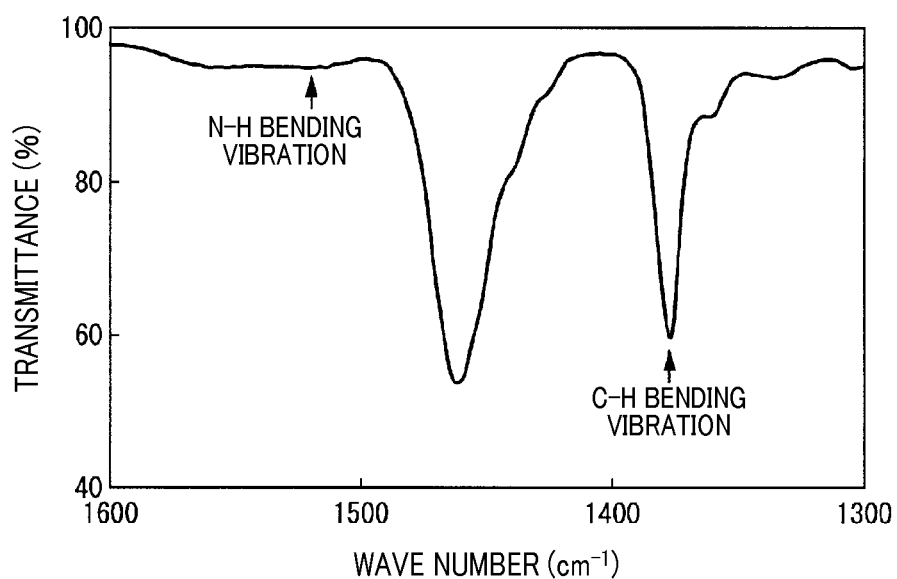
FIG. 7 shows an infrared absorption spectrum of a second adhesive layer made of an adhesive composition used in Examples B1 and B4.

The sample was immersed in a sodium hydroxide solution to completely dissolve the metal foil layer formed of an aluminum foil. Then, the infrared absorption spectrum of the exposed surface of the second adhesive layer remaining on the sealant layer side was measured by a reflection method, using an FT-IR (Fourier transform infrared spectroscopy). This is shown in FIG. 7 as an infrared absorption spectrum of the second adhesive layer made of an adhesive composition used in Examples B1 and B4 described later. From the obtained infrared absorption spectrum, absorption (X) derived from C—H bending vibration of $CH_3$ and absorption (Y) derived from N—H bending vibration of a biuret bond were calculated from the formulae (1) and (2) to calculate the ratio (Y/X). The results are shown in Table 4.

Absorption (X)=(Baseline Transmittance)−(Peak Transmittance around 1380 $cm^{-1}$)   (1)

Absorption (Y)=(Baseline Transmittance)−(Peak Transmittance around 1520 $cm^{-1}$)   (2)

In FIG. 7 and FIGS. 8 to 10 referred to later, the baseline transmittance was 100%.

(Evaluation of Electrolytic Resistance)

An electrolytic solution was prepared by adjusting $LiPF_6$ to be 1 M in a solution of ethylene carbonate/diethyl carbonate/dimethyl carbonate=1/1/1 (mass ratio), and filled in a Teflon® vessel. After adding 1500 ppm of water to the prepared electrolytic solution, the sample was put in the solution in the vessel and the vessel was hermetically sealed, followed by storage at 85° for 4 hours, 1 week, 2 weeks, and 4 weeks. Then, the sample was taken out of the vessel for evaluation of delamination of the sample in the following criteria. The results are shown in Table 4. In Table 4, the lamination strength is indicated in the upper row of the column of electrolytic resistance and evaluation is indicated in the lower row. Where delamination occurred and lamination strength could not be measured is indicated as "delamination".

○ (Good): Lamination strength was 10 N/15 mm or more (crosshead speed was 300 mm/min.)

Δ (Not good): Lamination strength was 5 N/15 mm or more and less than 10 N/15 mm (crosshead speed was 300 mm/min.)

X (Poor): Lamination strength was less than 5 N/15 mm (crosshead speed was 300 mm/min.)

Examples B2 and B3, Comparative Example B1

Figure 8:
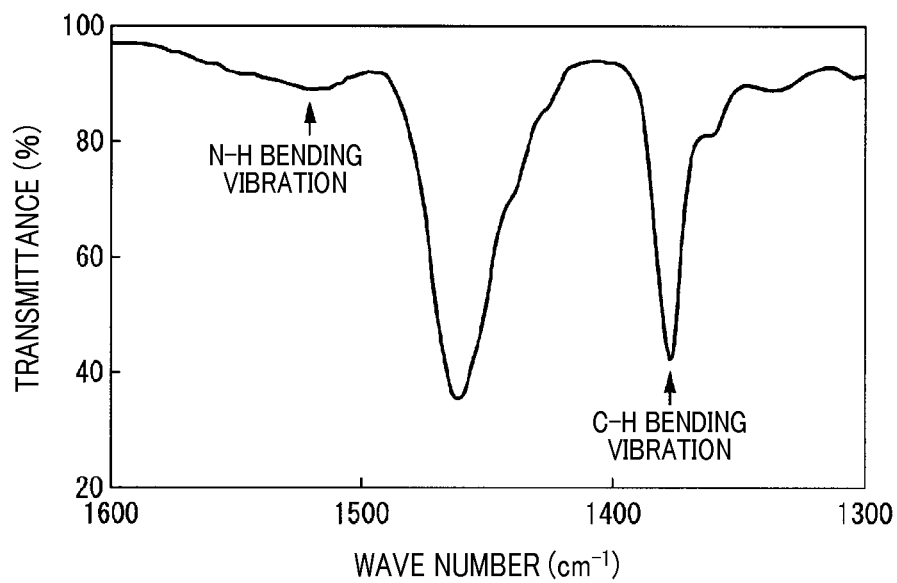
FIG. 8 shows an infrared absorption spectrum of a second adhesive layer made of an adhesive composition used in Examples B2 and B5.
Figure 9:
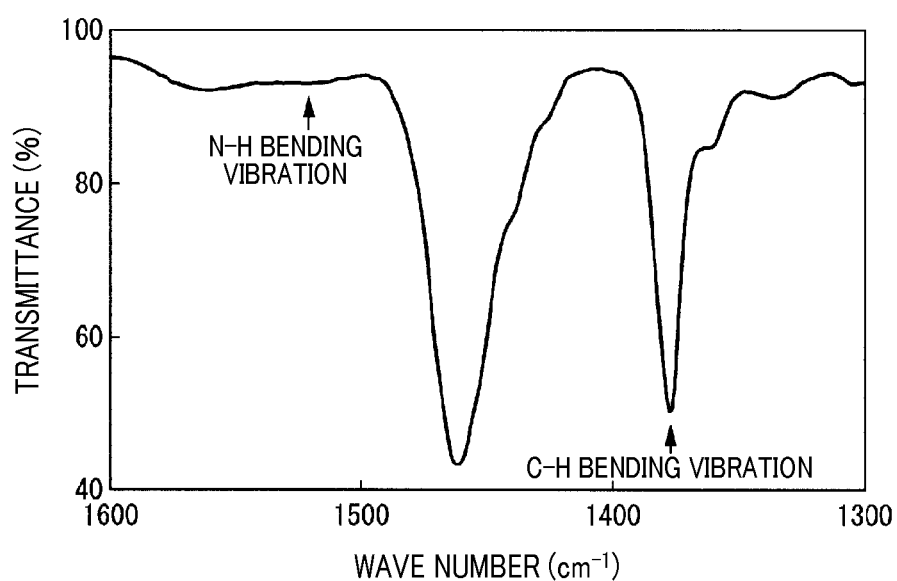
FIG. 9 shows an infrared absorption spectrum of a second adhesive layer made of an adhesive composition used in Examples B3 and B6.
Figure 10:
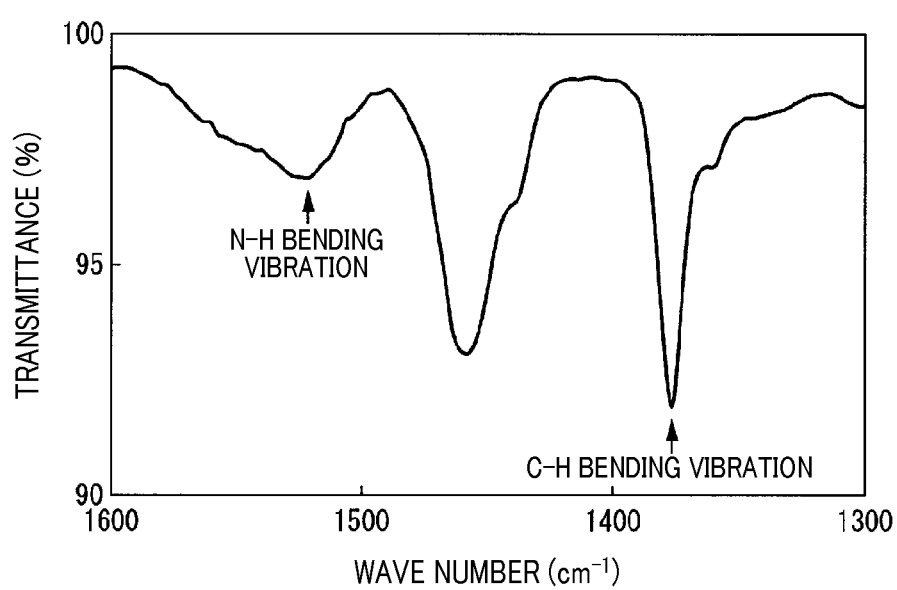
FIG. 10 shows an infrared absorption spectrum of a second adhesive layer made of an adhesive composition used in Comparative Examples B1 and B2.

A packaging material was prepared in the same manner as in Example B1, except for changing the material used for forming the second adhesive layer, and changing the aging temperature for aging the laminate as indicated in Table 3, for various measurements and evaluations. The results are shown in Table 4. The infrared absorption spectrum of the second adhesive layer made of the adhesive composition used in Examples B2 and B5 described later is shown in FIG. 8. The infrared absorption spectrum of the second adhesive layer made of the adhesive composition used in Examples B3 and B6 described later is shown in FIG. 9. The infrared absorption spectrum of the second adhesive layer made of the adhesive composition used in Comparative Examples B1 and B2 described later is shown in FIG. 10.

Example B4

A packaging material was prepared in the same manner as in Example B1, except for coating B-1 on A-1 (first inner corrosion prevention treatment layer) by microgravure coating, followed by drying to form a second inner corrosion prevention treatment layer, for various measurements and evaluations. The results are shown in Table 4. The amount of coating of B-1 was in the range of 70 to 100 $mg/m^2$.

Examples B5 and B6, Comparative Example B2

A packaging material was prepared in the same manner as in Example B4, except for changing the material used for forming the second adhesive layer, and changing the aging temperature for aging the laminate as indicated in Table 3, for various measurements and evaluations. The results are shown in Table 4.

TABLE 3

| | First Inner Corrosion Prevention Treatment Layer | Second Inner Corrosion Prevention Treatment Layer | Second Adhesive Layer | Aging Temperature (° C.) |
|---|---|---|---|---|
| Example B1 | A-1 | — | D-1 | 40 |
| Example B2 | A-1 | — | D-1 | 60 |
| Example B3 | A-1 | — | D-3 | 40 |
| Example B4 | A-1 | B-1 | D-1 | 40 |
| Example B5 | A-1 | B-1 | D-1 | 60 |
| Example B6 | A-1 | B-1 | D-3 | 40 |
| Comparative Example B1 | A-1 | — | D-2 | 40 |
| Comparative Example B2 | A-1 | B-1 | D-2 | 40 |

TABLE 4

| | Absorption | | | Electrolytic Resistance Lamination Strength (N/15 mm) | | | |
|---|---|---|---|---|---|---|---|
| | (X) | (Y) | (Y/X) | 4 Hours | 1 Week | 2 Weeks | 4 Weeks |
| Example B | 40 | 4.4 | 0.11 | 11.8 ○ | 8.0 Δ | 7.2 Δ | 6.5 Δ |
| Example B2 | 57.6 | 10.9 | 0.19 | 12.9 ○ | 11.3 ○ | 9.0 Δ | 8.2 Δ |
| Example B3 | 49.6 | 6.9 | 0.14 | 12.0 ○ | 11.0 ○ | 10.5 ○ | 9.2 Δ |
| Example B4 | 40 | 4.4 | 0.11 | 14.3 ○ | 12.3 ○ | 11.0 ○ | 10.5 ○ |
| Example B5 | 57.6 | 10.9 | 0.19 | 13.2 ○ | 12.2 ○ | 11.0 ○ | 10.5 ○ |
| Example B6 | 49.6 | 6.9 | 0.14 | 14.0 ○ | 12.5 ○ | 11.2 ○ | 10.3 ○ |
| Comparative Example B1 | 8.1 | 3.1 | 0.38 | 11.1 ○ | 3.0 X | Delamination | Delamination |
| Comparative Example B2 | 8.1 | 3.1 | 0.38 | 13.0 ○ | 2.9 X | Delamination | Delamination |

As clearly seen from Table 4, the packaging material obtained in each Example B exhibited good electrolytic resistance over a long period. In Examples B2 and B5, the second adhesive layer was formed using the same adhesive composition as in Examples B1 and B4 but the second adhesive layer had Y/X greater than that in Examples B1 and B4.

This is considered to be because the aging temperature was higher than in Examples B1 and B4 and the biuret reaction progressed more than in Examples B1 and B4.

In contrast, the packaging materials obtained in Comparative Examples B1 and B2 in which the second adhesive layer had Y/X of 0.38 exhibited insufficient lamination strength after one week of storage in the electrolytic solution, and caused delamination after 2 weeks, resulting in poor electrolytic resistance.

INDUSTRIAL APPLICABILITY

According to the present invention, a lithium battery packaging material capable of exhibiting good electrolytic resistance over a long period can be obtained.

REFERENCE SIGNS LIST 10, 110 Lithium battery packaging material
11 Substrate layer
12 First adhesive layer
13 Corrosion prevention treatment layer (outer corrosion prevention treatment layer)
14 Metal foil layer
15, 115 Corrosion prevention treatment layer (inner corrosion prevention treatment layer)
15a, 115a First inner corrosion prevention treatment layer
15b, 115b Second inner corrosion prevention treatment layer
16 Second adhesive layer
17 Sealant layer

What is claimed is:

1. A lithium battery packaging material, comprising a laminate in which a substrate layer, a first adhesive layer, an outer corrosion prevention treatment layer, a metal foil layer, an first inner corrosion prevention treatment layer, a second inner corrosion prevention treatment layer, a second adhesive layer, and a sealant layer are laminated in this order, wherein:

the first inner corrosion prevention treatment layer comprises a rare-earth oxide and 1 to 100 parts by mass of phosphoric acid or phosphate, relative to 100 parts by mass of the rare-earth oxide;

the second inner corrosion prevention treatment layer comprises a cationic polymer;

the outer corrosion prevention treatment layer comprises an anionic polymer, a rare-earth oxide and 1 to 100 parts by mass of phosphoric acid or phosphate, relative to 100 parts by mass of the rare-earth oxide;

the second adhesive layer is made of an adhesive composition containing an acid-modified polyolefin resin and a polyfunctional isocyanate compound; and in an infrared absorption spectrum of the second adhesive layer, a ratio (Y/X) between absorption (X) derived from C—H bending vibration of $CH_3$ and absorption (Y) derived from N—H bending vibration of a biuret bond is 0.3 or less, wherein the cationic polymer in the second inner corrosion prevention treatment layer is polyallylamine and the anionic polymer in the outer corrosion prevention treatment layer is polyacrylic acid.

2. The lithium battery packaging material of claim 1, wherein the rare-earth oxide in each of the first inner corrosion prevention treatment layer and the outer corrosion prevention treatment layer is cerium oxide.

3. The lithium battery packaging material of claim 2, wherein the acid-modified polyolefin is a maleic anhydride-modified polyolefin resin.

4. The lithium battery packaging material of claim 3, wherein the polyfunctional isocyanate compound has an isocyanurate structure.

5. The lithium battery packaging material of claim 3, wherein the polyfunctional isocyanate compound is hexamethylene diisocyanate having an isocyanurate structure.

* * * * *